United States Patent
Antonio et al.

(10) Patent No.: US 6,208,858 B1
(45) Date of Patent: Mar. 27, 2001

(54) SYSTEM AND METHOD FOR REDUCING CALL DROPPING RATES IN A MULTI-BEAM COMMUNICATION SYSTEM

(75) Inventors: Franklin P. Antonio; Gene W. Marsh, both of Del Mar; Richard A. Stewart, San Diego, all of CA (US); Marie M. Bjerede, West Linn, OR (US); Ananthanarayanan Chockalingam; Arthur S. Kerns, both of San Diego, CA (US); Brian Butler; Matthew S. Grob, both of La Jolla, CA (US); James T. Determan, Encinitas, CA (US); Douglas Grover; Leonard N. Schiff, both of San Diego, CA (US); William G. Ames, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/120,857

(22) Filed: Jul. 21, 1998

(51) Int. Cl.[7] .................................................... H04Q 7/20
(52) U.S. Cl. .................... 455/429; 455/12.1; 455/437; 370/331; 370/332
(58) Field of Search ................................. 455/437, 424, 455/439, 442, 12.1, 13.1, 13.3, 67.1, 423, 134, 135; 370/331, 332

(56) References Cited

U.S. PATENT DOCUMENTS

| | | | |
|---|---|---|---|
| 5,490,087 | * 2/1996 | Redden et al. ........................ 365/514 |
| 5,697,050 | * 12/1997 | Wiedeman ........................... 455/12.1 |
| 5,722,073 | * 2/1998 | Wallstedt et al. ..................... 455/437 |
| 5,752,187 | * 5/1998 | Frank et al. .......................... 455/428 |
| 5,920,550 | * 7/1999 | Willey .................................. 370/332 |
| 5,974,316 | * 10/1999 | Tayloe et al. ........................ 455/429 |
| 6,021,309 | * 2/2000 | Sherman et al. .................... 455/12.1 |
| 6,044,272 | * 3/2000 | Kobylinski et al. ................. 455/437 |
| 6,072,986 | * 6/2000 | Blanchard et al. .................. 455/13.4 |

* cited by examiner

Primary Examiner—Edward F. Urban
Assistant Examiner—Congvan Tran
(74) Attorney, Agent, or Firm—Phillip R. Wadsworth; Gregory D. Ogrod

(57) ABSTRACT

A method for reducing call dropping rates in a multi-beam communication system. The multi-beam communication system includes a user terminal, a gateway, and a plurality of beam sources, where each beam source projects a plurality of beams, and where a communication link between the user terminal and the gateway is established on one or more beams. The method according to the present invention relies on a messaging protocol between the gateway and the user terminal. Based on messages sent from the user terminal to the gateway, preferably on a preselected periodic basis, the gateway can determine the more desirable beam(s) for transmitting data or information to the user terminal. The messages sent from the user terminal to the gateway contain values representing beam strengths as measured at the user terminal. The gateway uses the user terminal measured beam strengths to select the beams that should be used for transmitting data or information to the user terminal. The beams that should be used are the beams that if used will decrease the call dropping rates and provide a desired level of beam source diversity.

20 Claims, 17 Drawing Sheets

BOUNDARY FOR SECTORS $\Big<\begin{array}{l}1\ 3\ 5 \quad \text{———}\\ 2\ 4\ 6 \quad \text{- - -}\end{array}$ FIG. 4A 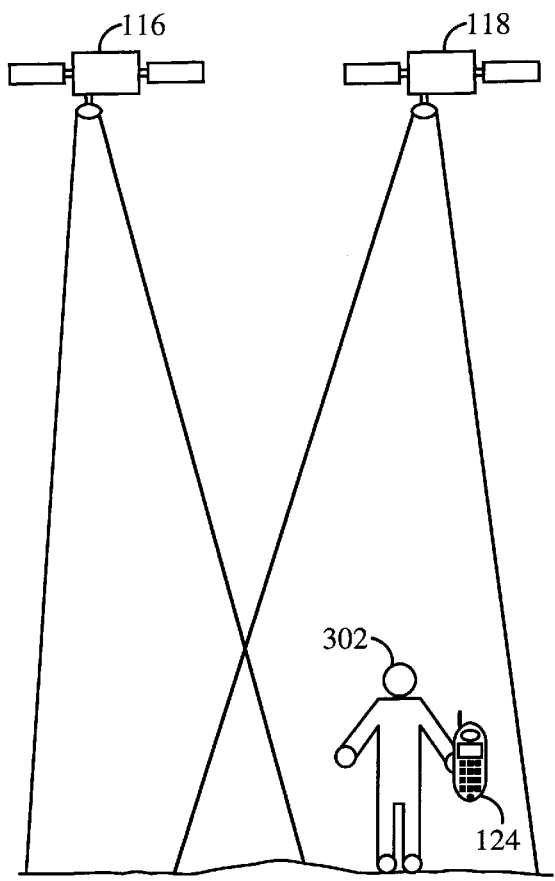 FIG. 4B 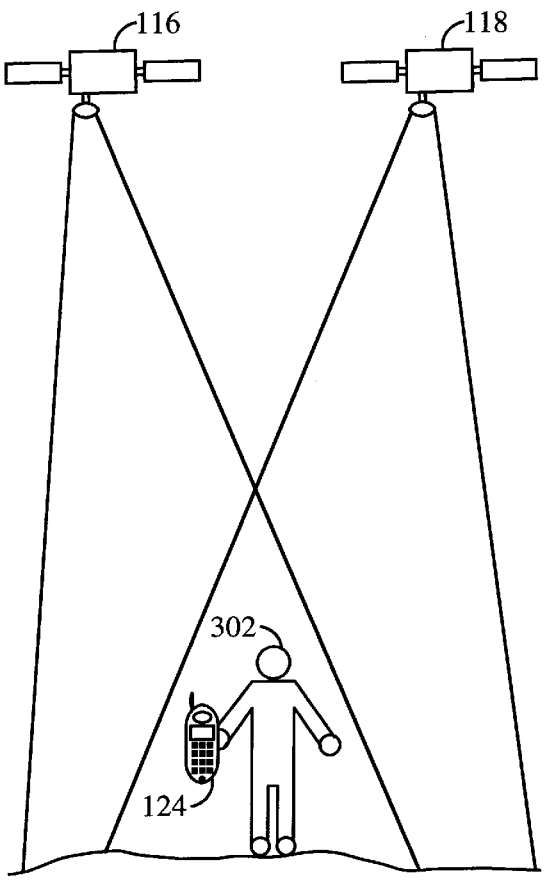
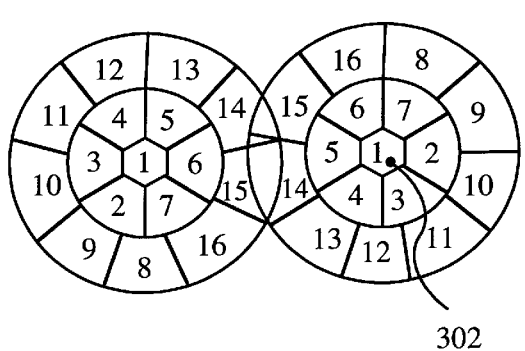
FIG. 4C
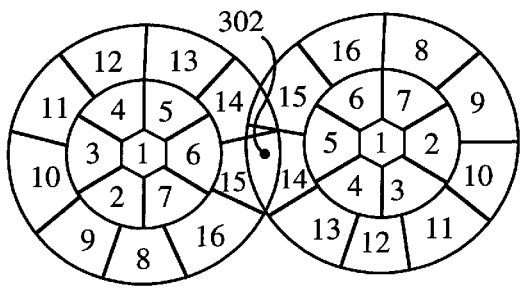
FIG. 4D

3MM
┌─────────────┐
│    600      │

| BEAM IDENTIFIER | |
|---|---|
| S1B1 | 602 |
| S1B3 | 604 |
| S1B4 | 606 |
| S1B11 | 608 |
| S1B12 | 610 |
| S2B15 | 612 |
| S2B16 | 614 |

FIG. 6A

| BEAM IDENTIFIER | MEASURED BEAM STRENGTH VALUES |
|---|---|
| S1B1 | 9 |
| S1B3 | 5 |
| S1B4 | 11 |
| S1B11 | 7 |
| S1B12 | 8 |
| S2B15 | 2 |
| S2B16 | 4 |

FIG. 6B

PAM
650

| BEAM IDENTIFIER | ADJUSTMENT VALUES |
|---|---|
| S1B11 | 3 |
| S1B12 | 4 |
| S2B15 | 5 |
| S2B16 | 5 |

FIG. 6C

| BEAM IDENTIFIER | ADJUSTED BEAM STRENGTH VALUES |
|---|---|
| S1B1 | 9 |
| S1B3 | 5 |
| S1B4 | 11 |
| S1B11 | 10 |
| S1B12 | 12 |
| S2B15 | 7 |
| S2B16 | 9 |

FIG. 6D

PSMM
660

| BEAM IDENTIFIER | ADJUSTED BEAM STRENGTH VALUES |
|---|---|
| S1B12 | 12 |
| S1B16 | 9 |
| S1B4 | 11 |
| S1B11 | 10 |
| S1B1 | 9 |
| S2B15 | 7 |

FIG. 6E

SYSTEM AND METHOD FOR REDUCING CALL DROPPING RATES IN A MULTI-BEAM COMMUNICATION SYSTEM

CROSS-REFERENCE TO RELATED APPLICATIONS

This patent application is related to the following commonly owned, co-pending U.S. utility patent application Ser. No. 08/722,330, filed on Sep. 27, 1996, entitled "Method and Apparatus for Adjacent Service Area Handoff in Communication Systems," which is incorporated herein by reference.

BACKGROUND OF THE INVENTION

I. Field of the Invention

The present invention relates generally to the field of wireless communications. More specifically, the present invention relates to a method for reducing call dropping rates in a wireless communication system having multiple beam communication links.

II. Related Art

There are a variety of wireless communication systems having multiple beam communication links. A satellite-based communication system is one such example. Another example is a cellular communication system. A satellite-based communication system includes one or more satellites to relay communications signals between gateways (also referred to as "communication stations" or "base stations") and user terminals. Gateways provide communication links for connecting a user terminal to other user terminals or users of other communications systems, such as a public telephone switching network. User terminals can be fixed or mobile, such as a mobile telephone, and positioned near a gateway or remotely located.

A satellite can receive signals from and transmit signals to a user terminal provided the user terminal is within the "footprint" of the satellite. The footprint of a satellite is the geographic region on the surface of the earth covered by the satellite communication system. In some satellite systems, a satellite's footprint is geographically divided into "beams," through the use of beam forming antennas. Each beam covers a particular geographic region within a satellite's footprint.

Some satellite communications systems employ code division multiple access (CDMA) spread-spectrum signals, as disclosed in U.S. Pat. No. 4,901,307, issued Feb. 13, 1990, entitled "Spread Spectrum Multiple Access Communication System Using Satellite or Terrestrial Repeaters," and U.S. Pat. No. 5,691,174, which issued Nov. 25, 1997, entitled "Method and Apparatus for Using Full Spectrum Transmitted Power in a Spread Spectrum Communication System for Tracking Individual Recipient Phase Time and Energy," both of which are assigned to the assignee of the present invention, and are incorporated herein by reference.

In communication systems employing CDMA, separate communication links are used to transmit communication signals to and from a gateway or base station in a cellular system. A forward communication link refers to communication signals originating at the gateway or base station and transmitted to a user terminal. A reverse communication link refers to communication signals originating at a user terminal and transmitted to the gateway or base station. In situations where satellite diversity is desired, the gateway establishes two or more forward links for a given user terminal, where each forward link is established on a beam from a different satellite. For example, in a two satellite diversity configuration a first forward link is established on a beam projected by a first satellite and a second forward link is established on a beam projected by a second satellite. In the above example, the user terminal receives information or data from the gateway on both the first and second beam. Satellite diversity provides increased system performance because fewer communication links or calls will likely be dropped. For example, if the beam carrying the first forward link is blocked by an obstruction (such as, a tall building), the connection between the user terminal and gateway will continue uninterrupted on the second forward link. The user will be unaware of the beam blockage. Consequently, beam source diversity is commonly desired in a multi-beam communication system.

In a satellite-based communications system where the satellites are not stationary with respect to a point on the surface of the earth, the geographic area covered by a given satellite is constantly changing. As a result, a user terminal that was at one time positioned within a particular beam of a particular satellite can at a later time be positioned within a different beam of the same satellite and/or within a different beam of a different satellite. Furthermore, because satellite communication is wireless, a user terminal is free to move about. Thus, even in systems where the satellites are stationary with respect to a point on the surface of the earth, it is likely that over time a user terminal will be covered by different beams. Consequently, if a communication link between a user terminal and a gateway is established on a first beam and the communication link is not established on other beams prior to the user terminal no longer being covered by the first beam, then, at some point, the user terminal will no longer be able to communicate with the gateway using the established communication link. As a result, an active call between the user terminal and the gateway will be dropped. Dropping calls in a communication system is a serious problem for service providers who strive to provide uninterrupted communication services. A similar call dropping problem may occur for mobile users moving around in sectored cells in terrestrial communication systems. That is, where the cells are subdivided into two or more smaller service areas which are covered at differing frequencies or using different code spaces. Here, mobile users may travel along or repeatedly cross sector boundaries within a cell, depending on such factors as cell and sector size and local physical environment.

What is, therefore, needed is a system and method for reducing call dropping rates in a multi-beam communication system. The system and method should maintain a desired level of beam source diversity to further enhance the reliability of the communication system.

SUMMARY OF THE INVENTION

In a multi-beam-communication system having a user terminal, a communication station for transmitting information to and receiving information from the user terminal and a plurality of beam sources, where each beam source projects a plurality of beams, and where a communication link between the user terminal and the communication station is established on one or more beams, the present invention provides a system and method for reducing call dropping rates. Furthermore, the system and method of the present invention maintain a desired level of beam source diversity.

The method according to the present invention relies on a messaging protocol between the communication station and the user terminal. Based on messages sent from the user terminal to the communication station, the communication station can determine the most desirable beam(s) on which to transmit information or data to the user terminal. The messages sent from the user terminal to the communication station contain values representing beam strengths as measured at the user terminal. The communication station uses these values to select the most desirable beams that should be used as a communication link between the communication station and the user terminal. The beams that should be used are the beams that if used will decrease call dropping rates and provide the desired level of beam source diversity.

The method according to one embodiment of the present invention includes the steps of: (1) transmitting from the communication station to the user terminal a Beam Mask Message (BMM) containing a plurality of beam identifiers, where each of the beam identifiers identifies a beam currently available to the communication station; (2) periodically measuring at the user terminal a strength of each beam identified in the BMM; (3) periodically transmitting from the user terminal to the communication station a Pilot Strength Measurement Message (PSMM) containing a plurality of beam strength values, where each beam strength value is a function of the measured strength of one of the beams identified in the BMM; (4) based on the beam strength values in the PSMM, selecting at the communication station one or more beams that should be used as a communication link between the communication station and the user terminal (i.e., the communication station selects a new active beam set); (5) at the communication station, transmitting information on all of the beams in the new active beam set; (6) transmitting from the communication station to the user terminal a Handoff Direction Message (HDM) if the one or more beams selected in step (4) are not the same one or more beams that are in the current active beam set, where the current active beam set consists of the one or more beams on which a communication link between the communication station and the user terminal is already established; and (7) receiving at the communication station a Handoff Completion Message (HCM) transmitted from the user terminal after the user terminal receives information on each of the beams in the new active beam set.

Based on the HDM, the user terminal can determine the one or more beams that the communication station selected in step (4) that should be used as a communication link between the communication station and the user terminal. In one embodiment, the HDM includes a beam identifier corresponding to each beam selected by the communication station in step (4). In another embodiment, the HDM includes an add beam set and a drop beam set. The add beam set includes a beam identifier for each beam within the new active beam set that is not in the current active beam set. The drop beam set includes a beam identifier for each beam in the current active beam set that is not in the new active beam set.

According to one embodiment, the plurality of beam strength values included in the PSMM include a plurality of values corresponding to a strongest beam in each satellite identified in the BMM. In another embodiment, the beam strength values in the PSMM are adjusted beam strength values.

In one embodiment, the step of selecting at the communication station one or more beams that should be used as a communication link between the communication station and the user terminal includes the steps of: (1) selecting the strongest beam in the PSMM; (2) determining the strongest alternate beam in the PSMM, where an alternate beam is a beam projected by a satellite other than the satellite that projects the beam selected in step (1); and (3) selecting the strongest alternate beam in the PSMM if the strength of the strongest beam in the PSMM minus the strength of the strongest alternate beam in the PSMM is less than a threshold amount.

In another embodiment, the step of selecting one or more beams on which to establish a communication link includes the steps of: (1) selecting the strongest beam in the PSMM; (2) determining the strongest alternate beam in the PSMM; (3) selecting the strongest alternate beam in the PSMM if the strength of the strongest beam in the PSMM minus the strength of the strongest alternate beam in the PSMM is less than or equal to a first threshold amount; (4) if the strength of the strongest beam in the PSMM minus the strength of the strongest alternate beam in the PSMM is greater than the first threshold amount, determining the strongest alternate beam in the current active set, where an alternate beam in the current active set is a beam in the current active set that is projected by a satellite other than the satellite that projects the beam selected in step (1); and (5) selecting the strongest alternate beam in the current active set if the strength of the strongest beam in the PSMM minus the strength of the strongest alternate beam in the current active set is less than or equal to a second threshold amount. In one embodiment of the present invention the second threshold amount is greater than the first threshold amount.

In another embodiment, the user terminal continually measures the beam strength of each beam in the current active set. If the beam strength of a beam in the current active set is less than the beam strength of that beam as reported in the previous PSMM by a predetermined amount and remains so over a specified interval of time, then the user terminal will transmit a new PSMM to the communication station.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

FIGS. 4A and 4B illustrate the position of a first satellite and a second satellite with respect to a user at a first and second point in time, respectively.

FIGS. 4C and 4D illustrate the position of the user in FIGS. 4A and 4B within the first and second's satellite footprint at the first and second points in time, respectively.

FIG. 6A illustrates an exemplary Beam Mask Message.

FIG. 6B illustrates example measured beam strength values.

FIG. 6C illustrates an exemplary Pilot Adjust Message.

FIG. 6D illustrates example adjusted beam strength values.

FIG. 6E illustrates an exemplary Pilot Strength Measurement Message (PSMM).

DETAILED DESCRIPTION OF THE PREFERRED EMBODIMENTS

I. Introduction

The present invention is suited for use in multi-beam communication systems. Such communication systems include communication systems employing Earth orbiting satellites or highly sectorized cells. However, it will be apparent to those skilled in the relevant art that the concept of the present invention can be applied to a variety of satellite systems even when not utilized for communications purposes. The present invention can also be applied to cells using a variety of cell sectorization schemes, again, even when not utilized for user communications.

A preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including those intended for position determination, and satellite and terrestrial cellular telephone systems. A preferred application is in CDMA wireless spread spectrum communication systems for mobile or portable telephone service.

II. A Typical Communications System

Figure 1:
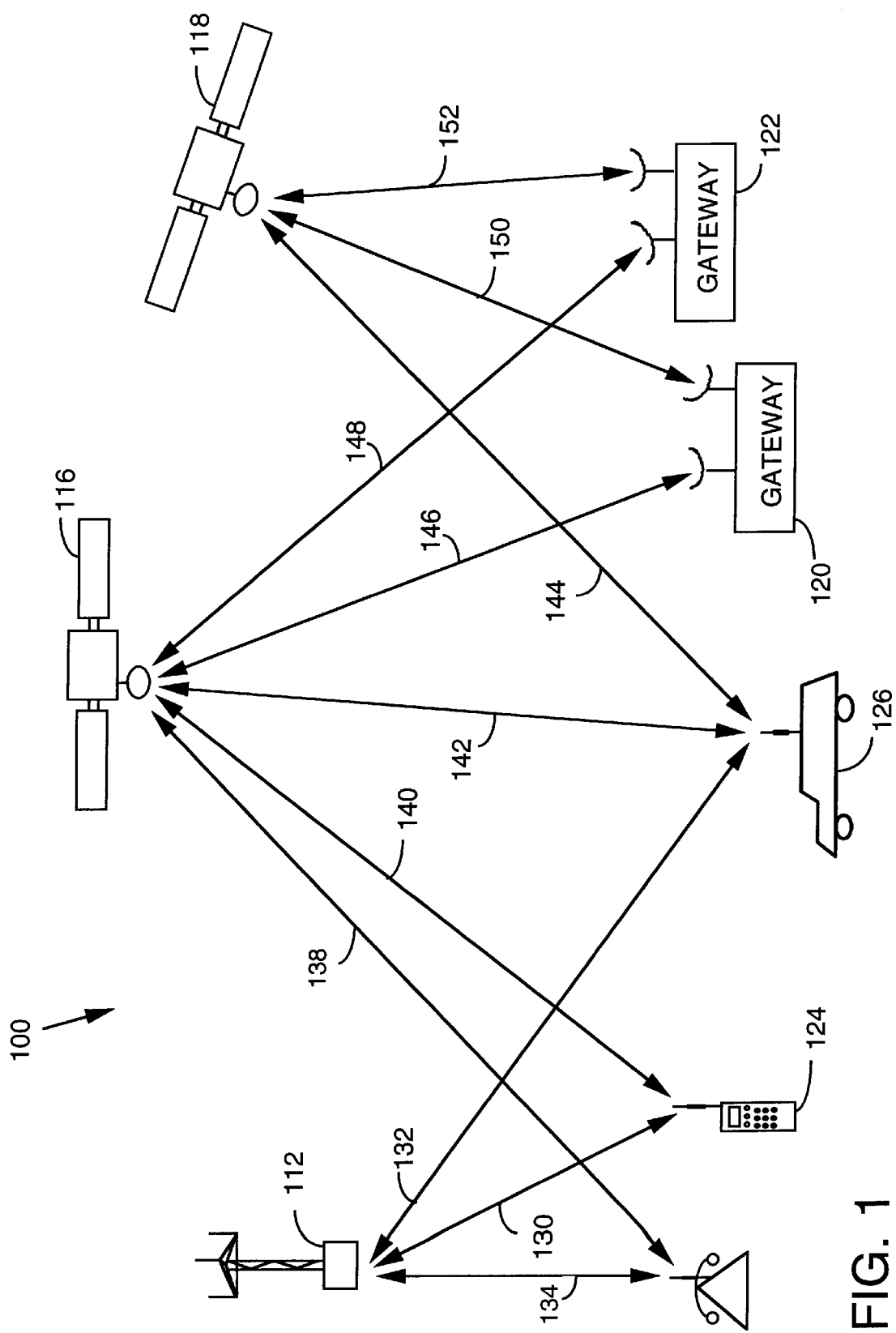
FIG. 1 illustrates an exemplary wireless communication system constructed and operating according to one embodiment of the present invention.

An exemplary wireless communication system in which the present invention is found useful, is illustrated in FIG. 1. It is contemplated that this communication system uses CDMA type communication signals, but this is not required by the present invention. In a portion of a communication system 100 illustrated in FIG. 1, one base station 112, two satellites 116 and 118, and two associated gateways or hubs 120 and 122 are shown for effecting communications with two remote user terminals 124, 126, and 128. Typically, the base stations and satellites/gateways are components of separate communication systems, referred to as being terrestrial and satellite based, although, this is not necessary. The total number of base stations, gateways, or satellites in such systems depends on desired system capacity and other factors well understood in the art.

The terms base station and gateway are also sometimes used interchangeably, each being a fixed central communication station, with gateways being perceived in the art as highly specialized base stations that direct communications through satellite repeaters while base stations (also sometimes referred to as cell-sites) use terrestrial antennas to direct communications within surrounding geographical regions. Gateways have more 'housekeeping tasks,' with associated equipment, to maintain satellite communication links, and any central control centers also typically have more functions to perform when interacting with gateways and moving satellites. However, the present invention finds application in systems using either gateways or base stations as communication stations.

User terminals 124, 126, and 128 each include a wireless communication device such as, but not limited to, a cellular telephone, a data transceiver, or a paging or position determination receiver, and can be hand-held, vehicle-mounted, or fixed as desired. Here, the user terminals are illustrated as hand-held, vehicle-mounted, and fixed telephones 124, 126, and 128 respectively. User terminals are sometimes also referred to as subscriber units, mobile stations, or simply as 'users' or 'mobiles' in some communication systems, depending on preference.

Generally, beams from a beam source (such as base station 112 or satellites 116 and 118) cover different geographical areas in predefined patterns. Beams at different frequencies, also referred to as CDMA channels or 'sub-beams', can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

While only two satellites are shown for clarity, a variety of multi-satellite communication systems have been proposed with an exemplary system employing on the order of 48 or more satellites, traveling in eight different orbital planes in Low Earth Orbit (LEO) for servicing a large number of user terminals. However, those skilled in the art will readily understand how the teachings of the present invention are applicable to a variety of satellite system and gateway configurations. This includes other orbital distances and constellations, for example, those using Geostationary satellites where beam-switching results mostly from user terminal motion. In addition, a variety of base station configurations can also be used.

FIG. 1 illustrates some possible signal paths for establishing communications between user terminals 124, 126, and 128 and base station 112, or through satellites 116 and 118, with gateways 120 and 122. The base station-user terminal communication links are illustrated by lines 130, 132, and 134. The satellite-user terminal communication links between satellites 116 and 118, and user terminals 124 126, and 128 are illustrated by lines 138, 140, 142, and 144.

The gateway-satellite communication links, between gateways 120 and 122, and satellites 116 and 118, are illustrated by lines 146, 148, 150, and 152. Gateways 120 and 122, and base station 112, may be used as part of a one-way or two-way communication system or simply to transfer messages/information or data to user terminals 124, 126, and 128.

Figure 2A:
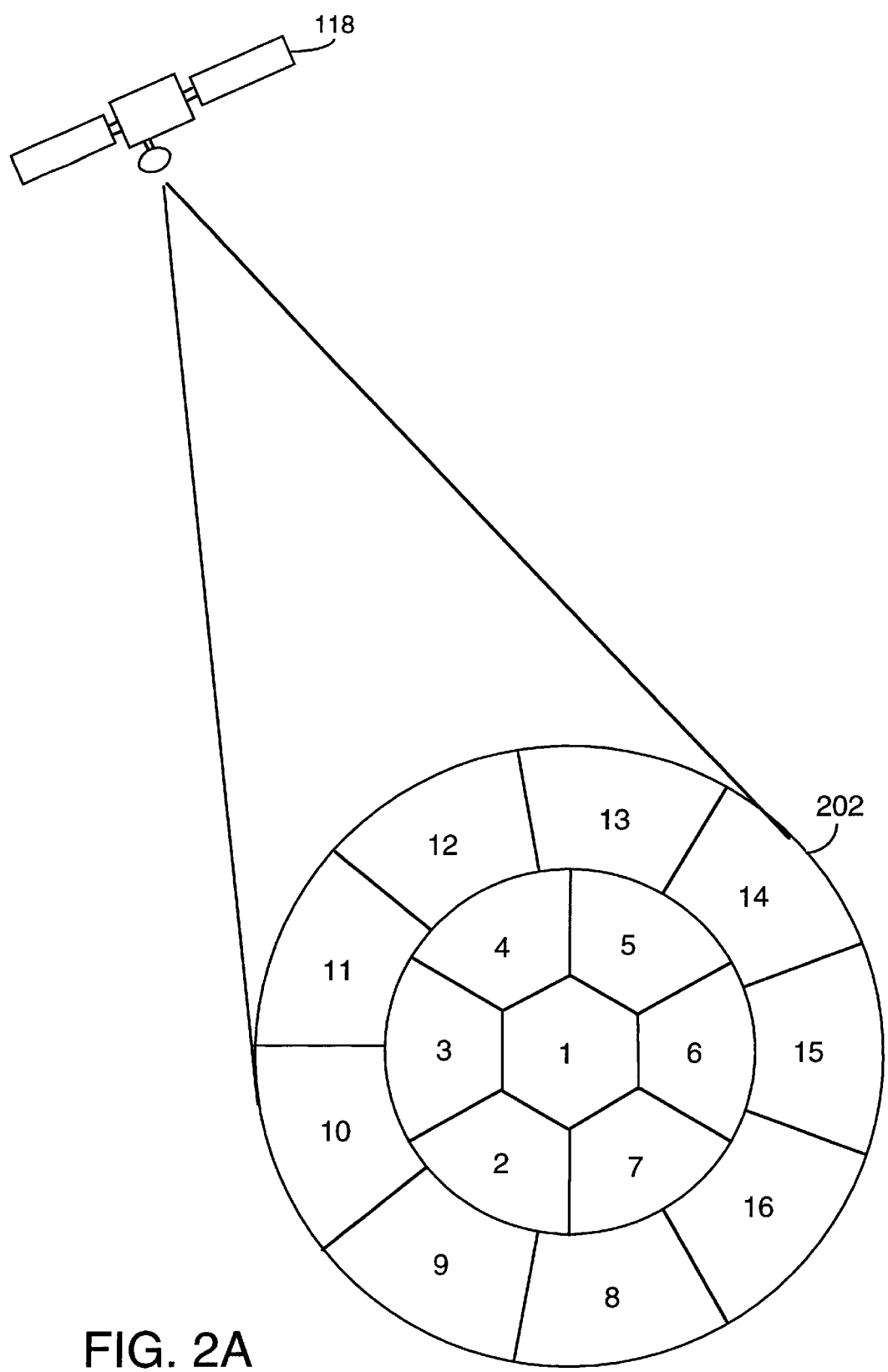
FIG. 2A illustrates an exemplary satellite footprint according to one embodiment of the present invention.

FIG. 2A illustrates an exemplary satellite beam pattern 202, also known as a footprint. As shown in FIG. 2A, the exemplary satellite footprint 202 includes sixteen beams. Each beam covers a specific geographical area, although there usually is some beam overlap. The satellite footprint shown in FIG. 2 includes an inner beam (beam 1), middle beams (beams 2–7), and outer beams (beams 8–16). This beam pattern is a particular predefined pattern used to reach users positioned within outer portions of the footprint, where the signal strength is lower due to natural "roll-off" effect created by the surface of the earth, without creating additional interference. The beams are illustrated as having non-overlapping geometric shapes for purposes of illustration only. However, those skilled in the art will readily appreciate that other beam patterns and shapes may be used in various communication system designs.

Figure 2B:
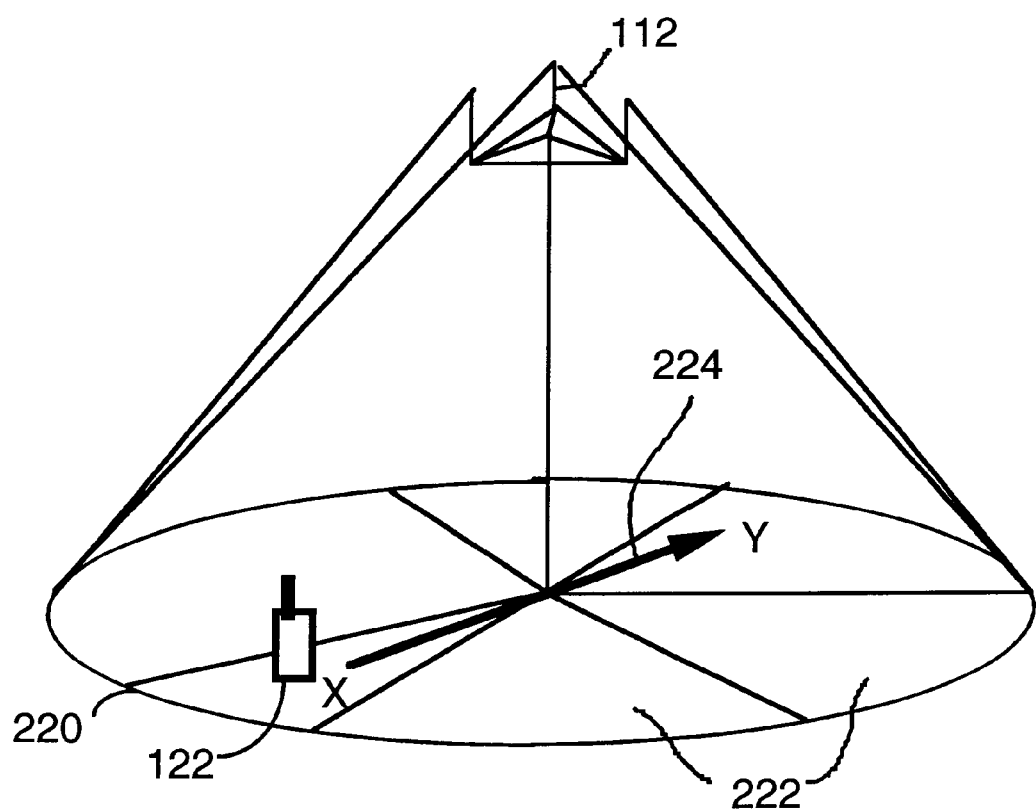
FIG. 2B illustrates a perspective view of a signal beam pattern between a base station of FIG. 1 and the surface of the Earth.

As shown in FIG. 2B, base stations or cell cites in such a communication system (100), including base station 112, project beams or signals within a cell 220 covering a predetermined service area on the Earth's surface in accordance with signal strength and local terrain. Cell 220 consists of one overall coverage area formed by a series of separate beams or signals that create sectors 222, projected in a generally wedge shaped patterns. Here, cell 220 is formed using a series of six sectors 222, not all having the same area or size. However, a variety of patterns, sectors, and sector sizes can be used, as would be known to one skilled in the art. As discussed further below, a user may move from a position X in one sector 222 to a position Y in a neighboring sector 222 along a path illustrated by line 224. This occurs as a result of either user terminal movement or changing sector coverage or a combination of both.

Figure 2C:
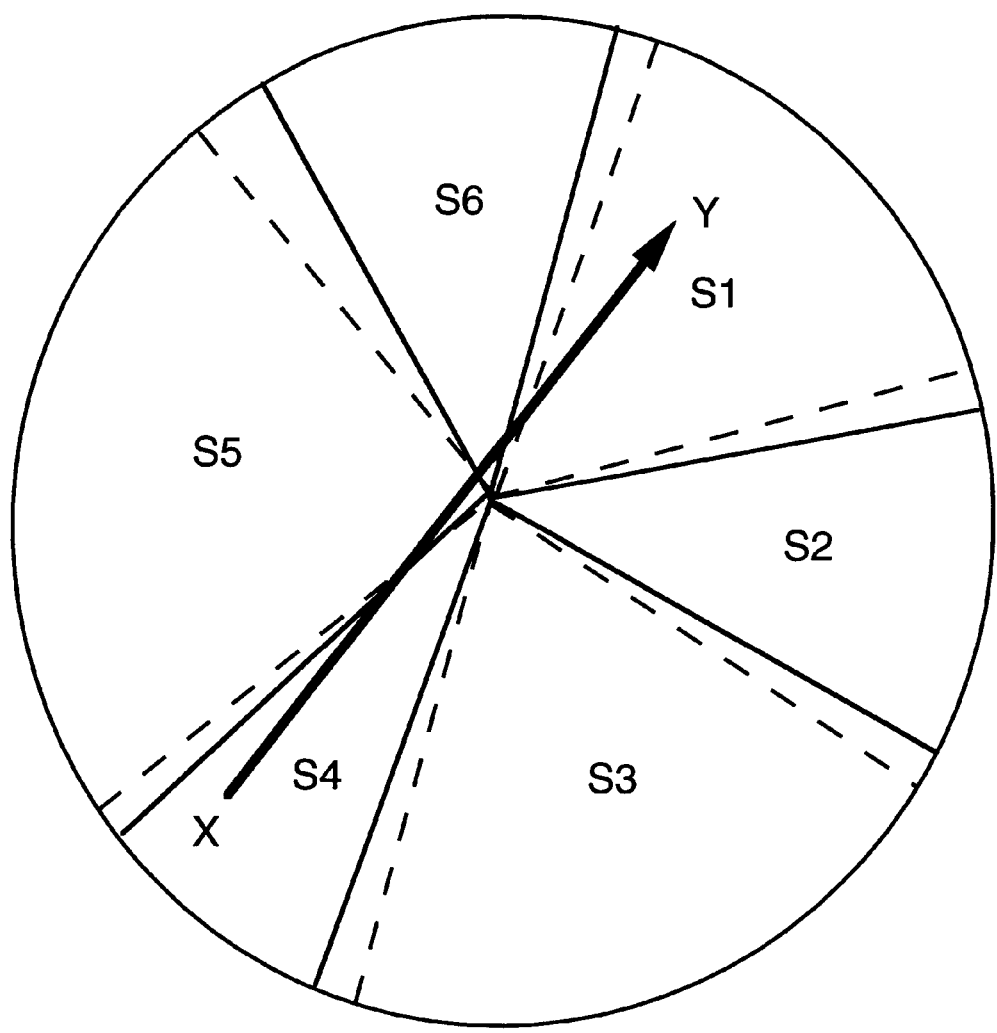
FIG. 2C illustrates an exemplary signal pattern for a base station in FIG. 1 with typical theoretical sector boundaries and variations.

An exemplary sector pattern is illustrated in further detail in FIG. 2C. In FIG. 2C, a series of sectors S1-S6 are shown in a generally circular pattern or cell 220. This cell is illustrated as having irregular edges as a result of how the signals are projected by transponders or antenna systems and the impact of local terrain or structures, as known in the art. As illustrated, the sectors need not be uniform in size, and may even have their respective coverage areas adjusted during operation of the communication system. The sector beams or signals also create overlapping sector boundaries or regions of coverage between adjacent sectors, with beam energies generally being tailored at transmission, to decrease more rapidly near the edges or boundaries, to decrease overlapping signal coverage. The overlapping boundaries are shown using solid and dashed lines for adjacent sector boundaries. The adjacent sectors in this example each use different PN codes or code offsets in a manner similar to the satellite sub-beams. Those skilled in the art are familiar with these types of patterns and the frequency and PN code assignments used to form such patterns.

Figures 3A, 3B:
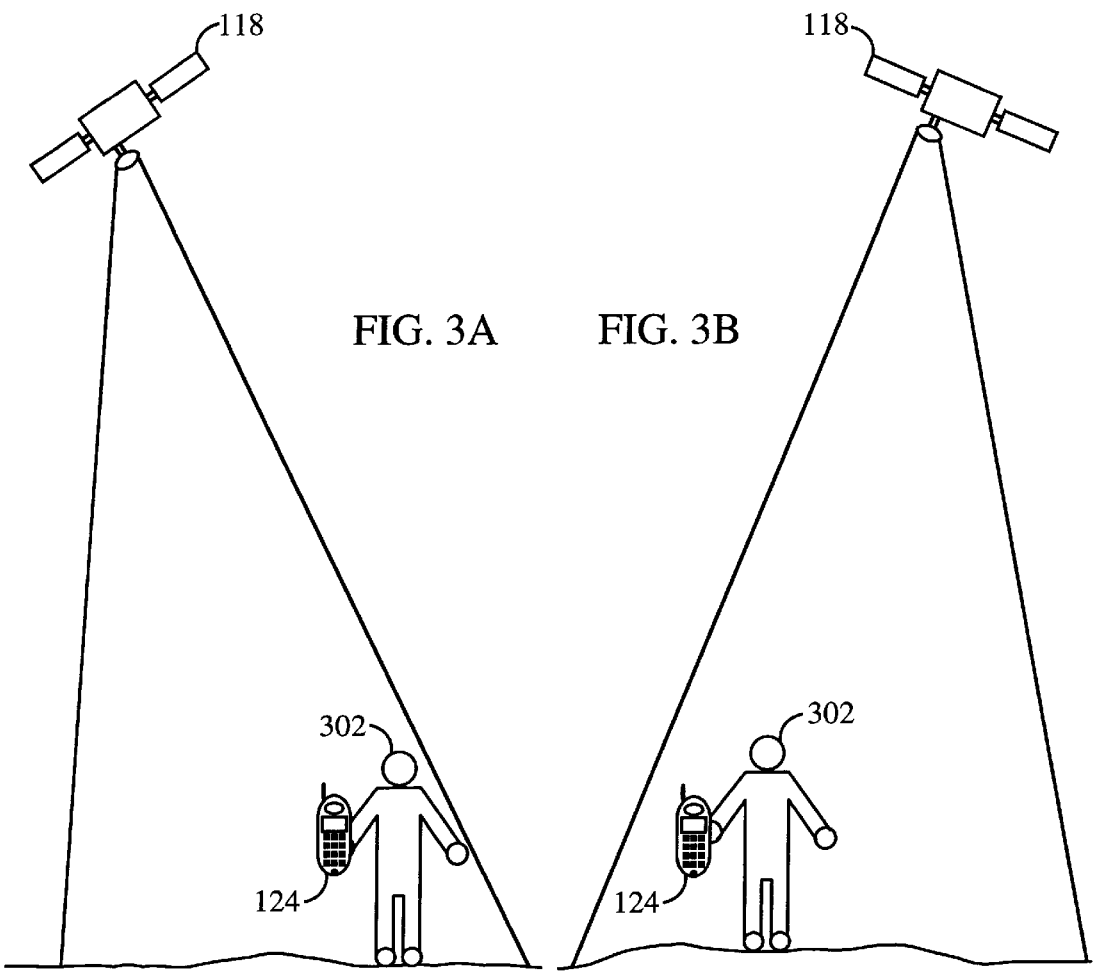
FIGS. 3A and 3B illustrate the position of a satellite with respect to a user at a first and second point in time, respectively.
Figure 3C:
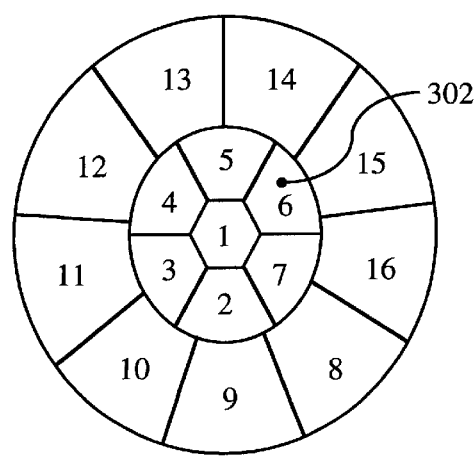
FIGS. 3C and 3D illustrate the position of the user in FIGS. 3A and 3B within the satellite's footprint at the first and second points in time, respectively.
Figure 3D:
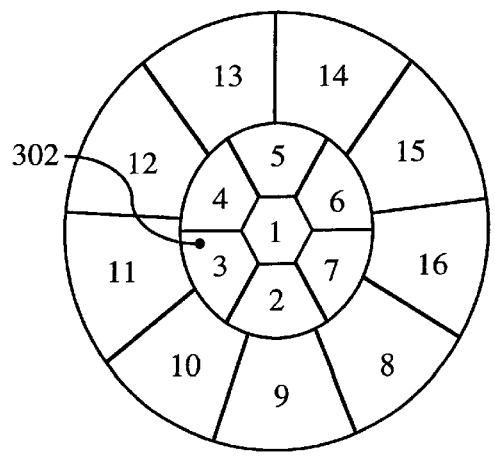

FIGS. 3A–4D best illustrate the problem identified by the inventors that the present invention is designed to overcome. FIG. 3A illustrates the relative position of satellite 118 to user 302 at a first point in time, and FIG. 3B illustrates the relative position of satellite 118 to user 302 at a second point in time. FIG. 3C is an overhead view of user 302 and the satellite beam pattern at the first point in time, and FIG. 3D is an overhead view of user 302 and the satellite beam pattern at the second point in time. As shown in FIGS. 3C and 3D, at the first point in time, user 302 is primarily covered by beam six of satellite 118, and at the second point in time user 302 is primarily covered by beam three of satellite 118. At the first point in time, user terminal 124 detects beam six as having the strongest signal as compared to the other beams. At the second point in time, user terminal 124 detects beam three as having the strongest signal. Consequently, if the active call established on beam six is not "handed off" (transferred to beam three) by the second point in time, the call may get dropped.

FIGS. 4A–4D illustrate beam source diversity. FIG. 4A illustrates the relative positions of satellites 118 and 116 to user 302 at a first point in time, and FIG. 4B illustrates the relative positions of satellites 118 and 116 to user 302 at a second point in time. FIG. 4C is an overhead view of user 302 and the satellite beam pattern at the first point in time, and FIG. 4D is an overhead view of user 302 and the satellite beam pattern at the second point in time. As shown in FIGS. 4C and 4D, at the first point in time, user 302 is primarily covered by beam one of satellite 118, and at the second point in time user 302 is primarily covered by beam fifteen of satellite 116, and beam eleven of satellite 118.

The problem recognized by the inventors is that it is easy to determine the most desirable beam(s) to establish a communication link on if you have exact knowledge of where the user terminal is within a satellite's footprint. But the gateway, which chooses which beam(s) to establish a communication link on, does not know where the user terminal is positioned. Moreover, even if the user position is known, blockage by physical objects such as trees, buildings, etc. may render the "best beam(s)" unusable. As a result, the inventors have designed a beam handoff procedure for choosing the most desirable beam(s) for a user terminal to receive traffic on given that the position of the user terminal is not known and given the possibility of beam blockage.

The procedure is aimed at reducing hand off rates and call dropping rates while maintaining a desired level of beam source diversity. The procedure relies on a messaging protocol between the gateway and the user terminal. Based on messages sent from the user terminal to the gateway, the gateway can determine the most desirable beam(s) for transmitting information to the user terminal. The messages sent from the user terminal to the gateway contain values representing beam strengths as measured at the user terminal.

III. Description of the Beam Handoff Procedure

Figure 5A:
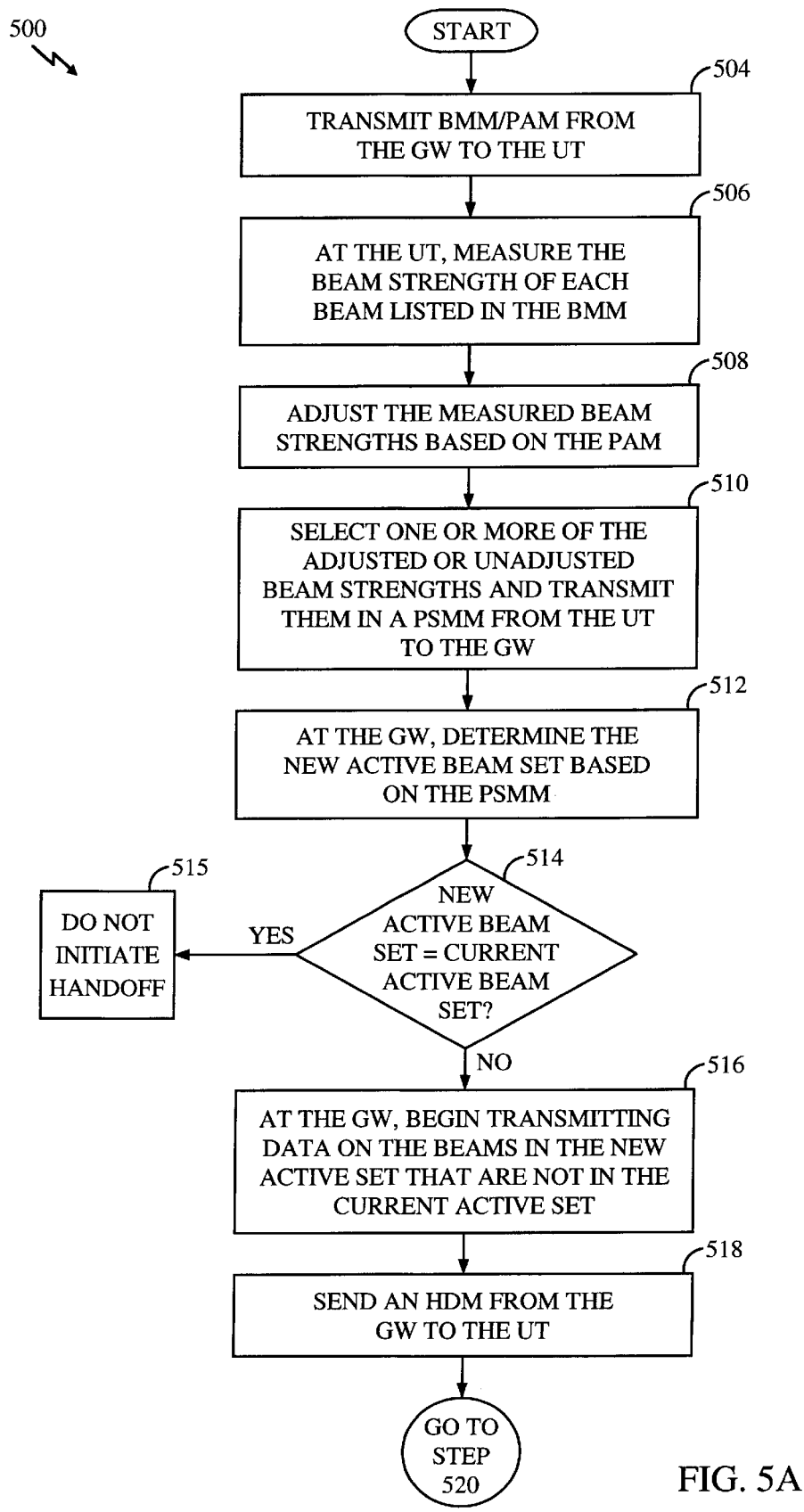
FIGS. 5A and 5B illustrate a beam handoff procedure according to a preferred embodiment of the present invention.
Figure 5B:
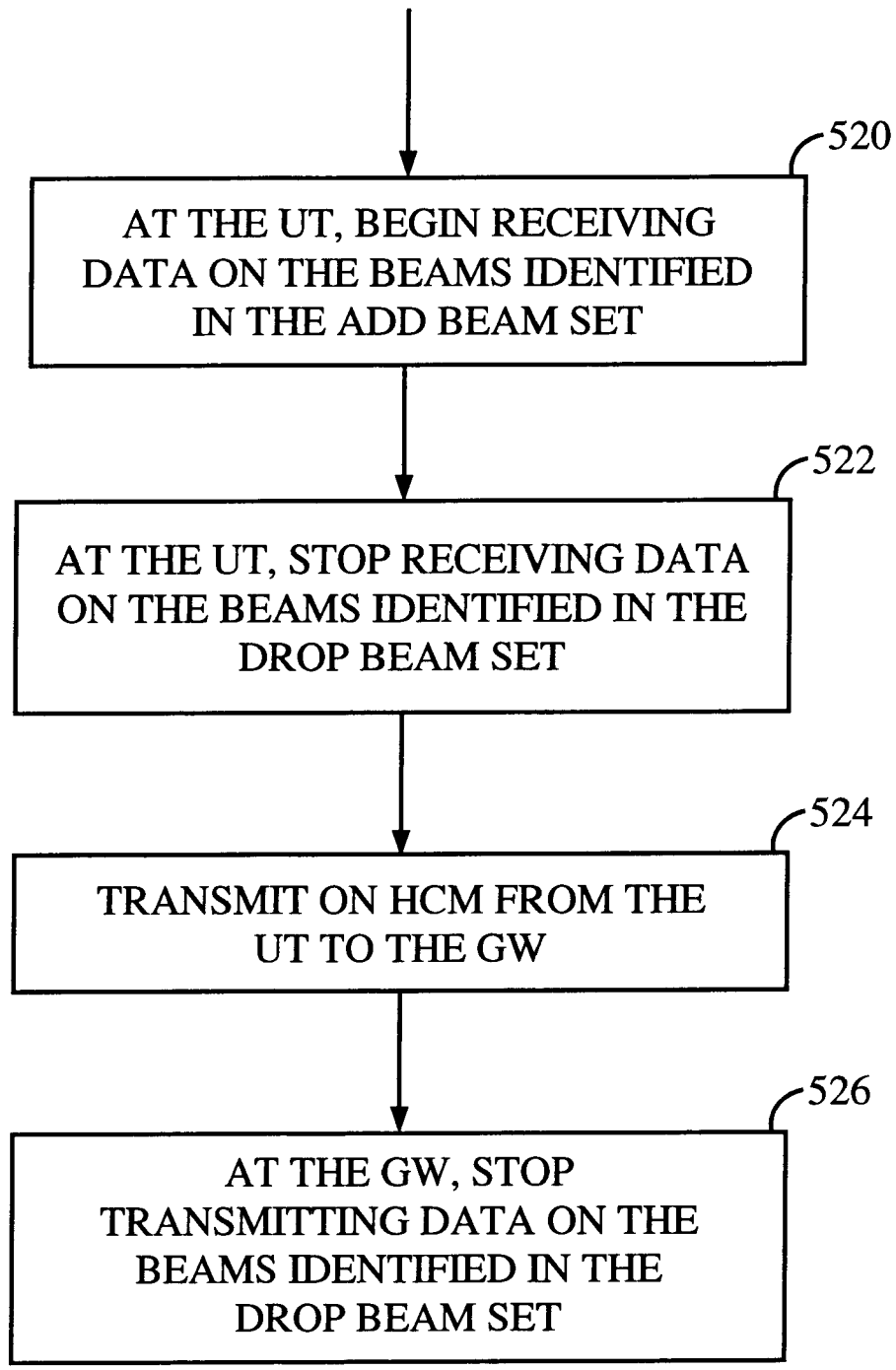

The beam hand off procedure will be described with reference to flowchart 500 illustrated in FIGS. 5A and 5B. The procedure assumes that at least one communication link between the user terminal and a gateway initially exists on a beam. That is, the gateway has selected a beam on which to transmit data or information to the user terminal.

The beam hand off procedure begins at step 504. In step 504, the gateway transmits a Beam Mask Message (BMM) to the user terminal over the established communication link(s). The BMM contains a list of beam identifiers. Each beam identifier in the list identifies a beam over which the gateway can transmit data or information. In addition to sending a BMM to the user terminal, the gateway can send a Pilot Adjust Message (PAM) to the user terminal. A PAM contains one or more pilot adjust values. The pilot adjust values are used to implement load balancing, and will be discussed in further detail with respect to step 508.

The gateway performs step 504 periodically. For example, the gateway may send an updated BMM every minute. The period of one minute was chosen because within approximately each minute one or more new beams become available to the gateway.

FIG. 6A illustrates an exemplary BMM 600. As shown in FIG. 6A, BMM 600 consists of a list of beam identifiers 602–614. Beam identifiers 602–614 each identify a satellite/beam pair. For example, the first beam identifier 602 in BMM 600 identifies beam one from satellite one, and the second beam identifier 604 identifies beam three from satellite one.

The user terminal measures the beam strength of each beam identified in the most recent BMM received from the gateway (step 506). FIG. 6B illustrates exemplary measured beam strength values for the beams identified in BMM 600. In one embodiment, the user terminal measures a beam strength by measuring the amount of energy in a pilot signal associated with the beam. Pilot signals are used by user terminals to obtain initial system synchronization and time, frequency, and phase tracking of other signals transmitted by the gateway. A single pilot signal is typically transmitted by each gateway for each frequency used, referred to as a CDMA channel or sub-beam, and shared by all user terminals receiving signals from that gateway on that frequency. Pilot signal strength can be measured using one of several known techniques. For example, one such technique is disclosed in U.S. patent application Ser. No. 08/722,330, filed on Sep. 27, 1996, entitled "*Method and Apparatus for Adjacent Service Area Handoff in Communication Systems*," which is incorporated herein by reference.

After measuring the beam strengths, the user terminal can optionally adjust one or more of the measured beam strength values using the one or more pilot adjust values that can optionally be sent from the gateway in a PAM (step 508). The pilot adjust values are used to implement load balancing. The pilot adjust values compensate for the difference between the beam strengths of the beams projected by a particular satellite. For example, there are situations where the outer beams are made stronger than the inner and middle beams. Thus, without the pilot adjust values, the outer beams will be selected by the gateway for establishing a communication link far more often than the other beams. This could present a load balancing problem. Therefore, to balance the load evenly among the beams, the gateway sends PAMs to the user terminal to adjust the value of the beam strength being used.

FIG. 6C illustrates an exemplary PAM. As shown in FIG. 6C, PAM 650 contains one or more adjustment values corresponding to one or more beams listed in BMM 600. For example, PAM 650 contains an adjust value for beam eleven of satellite one and an adjust value for beam sixteen of satellite two. A PAM can be transmitted by the gateway at any time. In most instances, the PAM is sent as part of the BMM. The user terminal adds the adjustment values to the appropriate measured beam strength values. FIG. 6D illustrates the adjusted beam strength values for the beams identified in BMM 600 based on PAM 650.

After step 508, the process progresses to step 510, where the user terminal transmits a Pilot Strength Measurement Message (PSMM) to the gateway. It should be noted that steps 506–510 are performed periodically by the user terminal. Selecting the appropriate period is valuable. If the user terminal measures or reports too often, the user terminal will still be within the same beam(s) and, thus, report the same signal level. This wastes system overhead in the traffic channels where the reporting is done because the user terminal is transferring information that has not changed. In addition, user terminal and gateway processing capacity is being unnecessarily consumed. On the other hand, if the user terminal reports at too large an interval or over too long a period, then the user terminal may miss a good beam that has passed by.

In one embodiment, selecting the period is accomplished by establishing the parameters for a specific system and simulating the resulting beams and motion. Therefore, based on a given satellite constellation (number) and ephemeris (motion and location), one can predict the motion and rates of change for beams. From this, one can arrive at a reasonable prediction of the appropriate period. Historical data taken when a system is in use can also be used to adjust this period, as desired. In one embodiment, the period is ten seconds. That is, every ten seconds, the user terminal transmits a PSMM to the gateway.

The PSMM transmitted from the user terminal to the gateway contains one or more beam identifiers from BMM 600 and corresponding beam strength values. The corresponding beam strength values can be the adjusted or unadjusted beam strength values. In one embodiment of the invention, the PSMM contains at most six beam identifiers and their corresponding beam strength values. However, other numbers of beams can be used depending on well known factors such as system complexity, processing power, storage capacity, etc. The contents of an exemplary PSMM 660 is illustrated in FIG. 6E.

Figure 7:
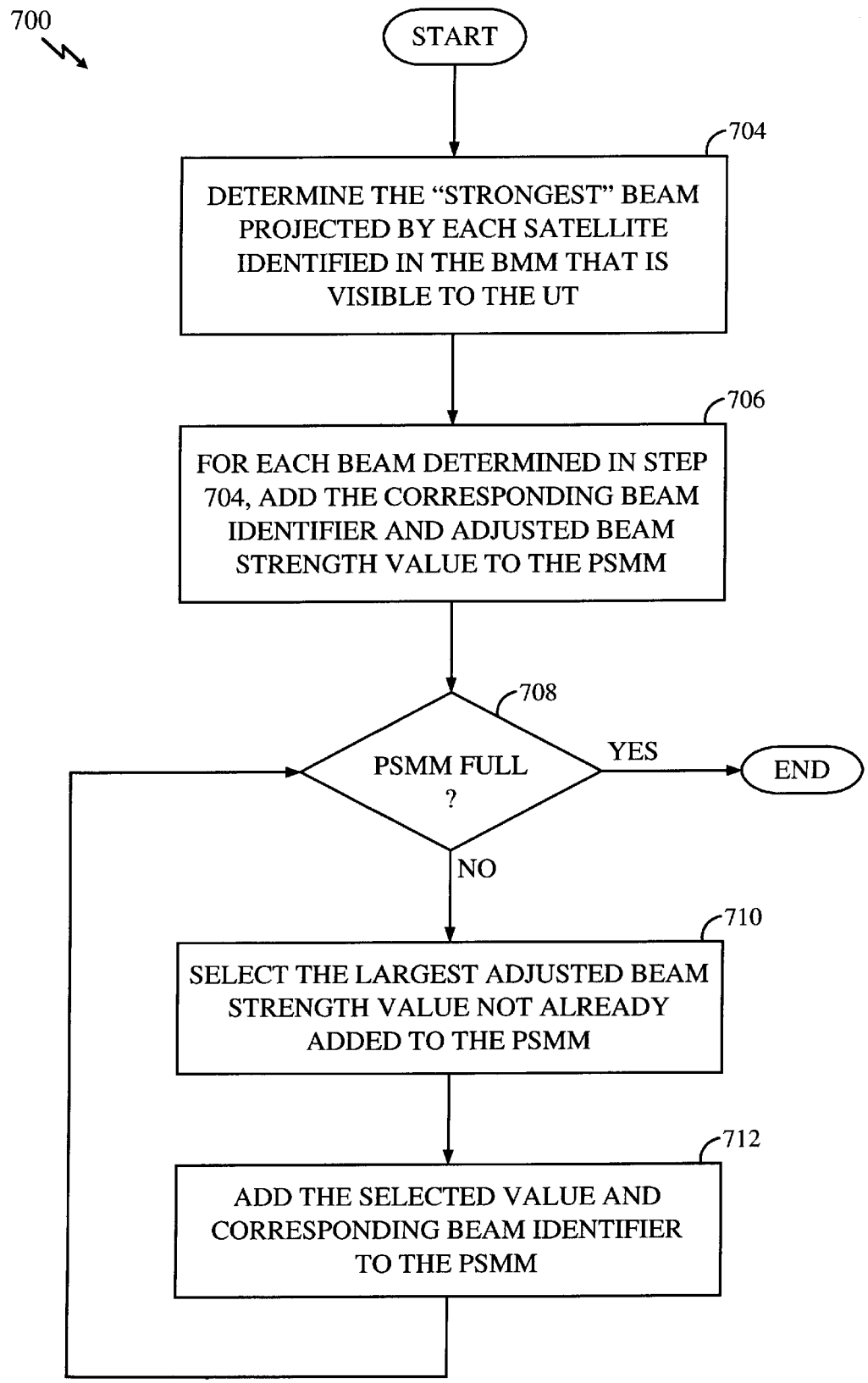
FIG. 7 illustrates an exemplary procedure used by a user terminal for establishing the contents of a PSMM.

The flowchart of FIG. 7 illustrates a preferred procedure employed at the user terminal for selecting the one or more beams (the one or more beam identifiers from BMM 600 and corresponding beam strength values) to include in the PSMM. The objective of procedure 700 is to achieve a desired level of satellite diversity. Thus, at least one beam from every satellite identified in the BMM that is visible to the user terminal is added to the PSMM. For example, if the BMM identifies three different satellites that are all visible to the user terminal, the PSMM will contain at least three beam identifiers and at least three corresponding beam strength values, where each one of the at least three identifiers identifies a beam from a different one of the three satellites.

Procedure 700 begins at step 704. In step 704, the user terminal uses the adjusted measured beam strengths to determine the "strongest" beam projected by each satellite identified in the BMM. The "strongest" beam is the beam having the largest corresponding adjusted beam strength value. For each beam determined in step 704, the user terminal includes each beam's beam identifier and corresponding adjusted beam strength value in the PSMM (step 706). In the next step, the user terminal determines if more values can be added to the PSMM (step 708). The user terminal determines this by subtracting the number of beams in the PSMM from the maximum allowable number of beams that can be added to the PSMM. In a preferred embodiment, six is the maximum allowable number of beams that can be included in the PSMM. If more beams can be added to the PSMM control passes to step 710, otherwise the procedure ends. In steps 710 and 712, the user terminal selects the strongest beam not already added to the PSMM and adds that beam's beam identifier and corresponding beam strength value to the PSMM. After step 712, control passes back to step 708. In another embodiment, the user terminal uses the unadjusted beam strength values when performing procedure 700. Consequently, the PSMM can contain unadjusted or adjusted beam strength values.

Figure 8:
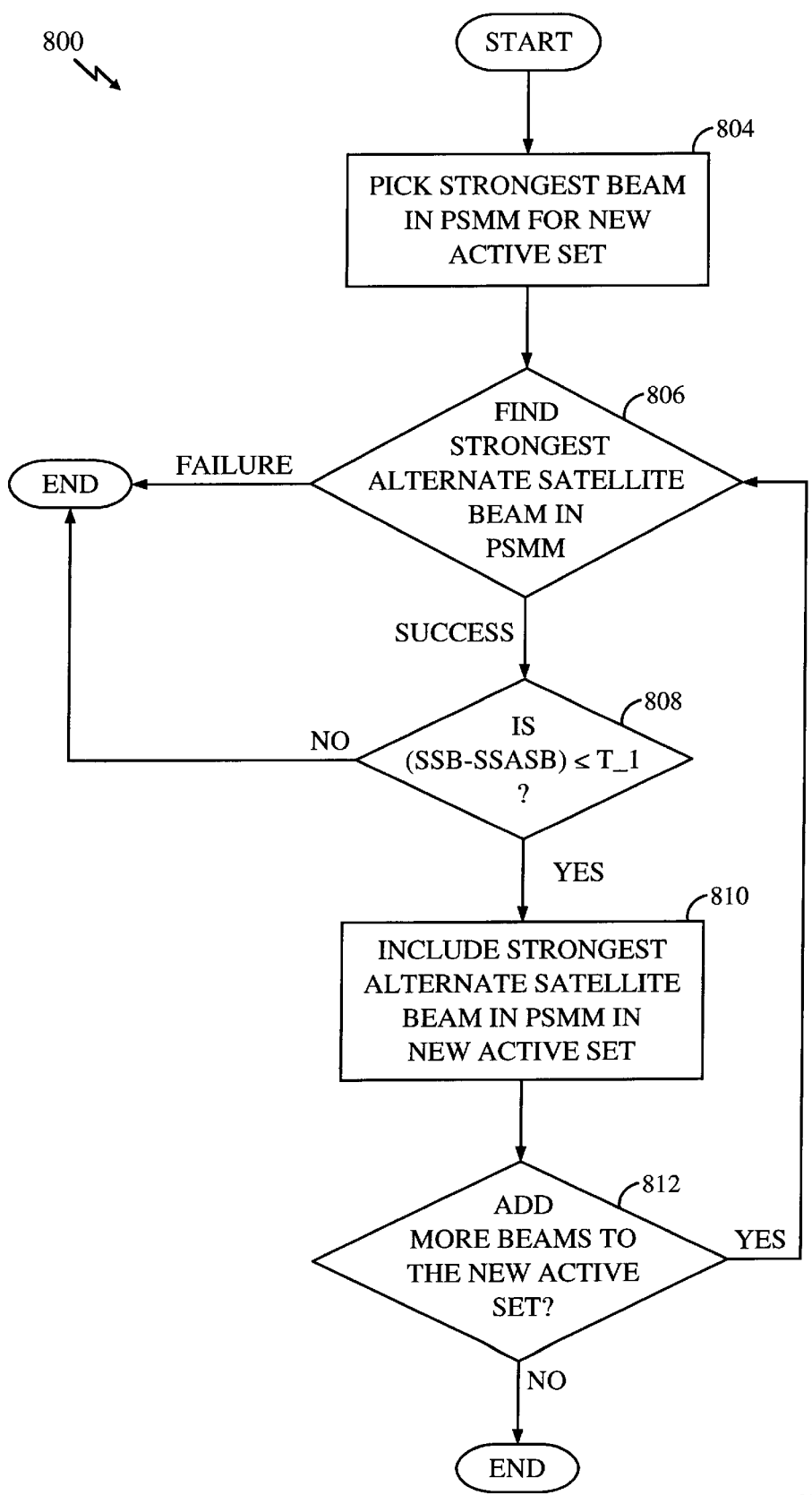
FIG. 8 illustrates a procedure used by a gateway for selecting beams for a new active set according to a first embodiment.
Figure 9:
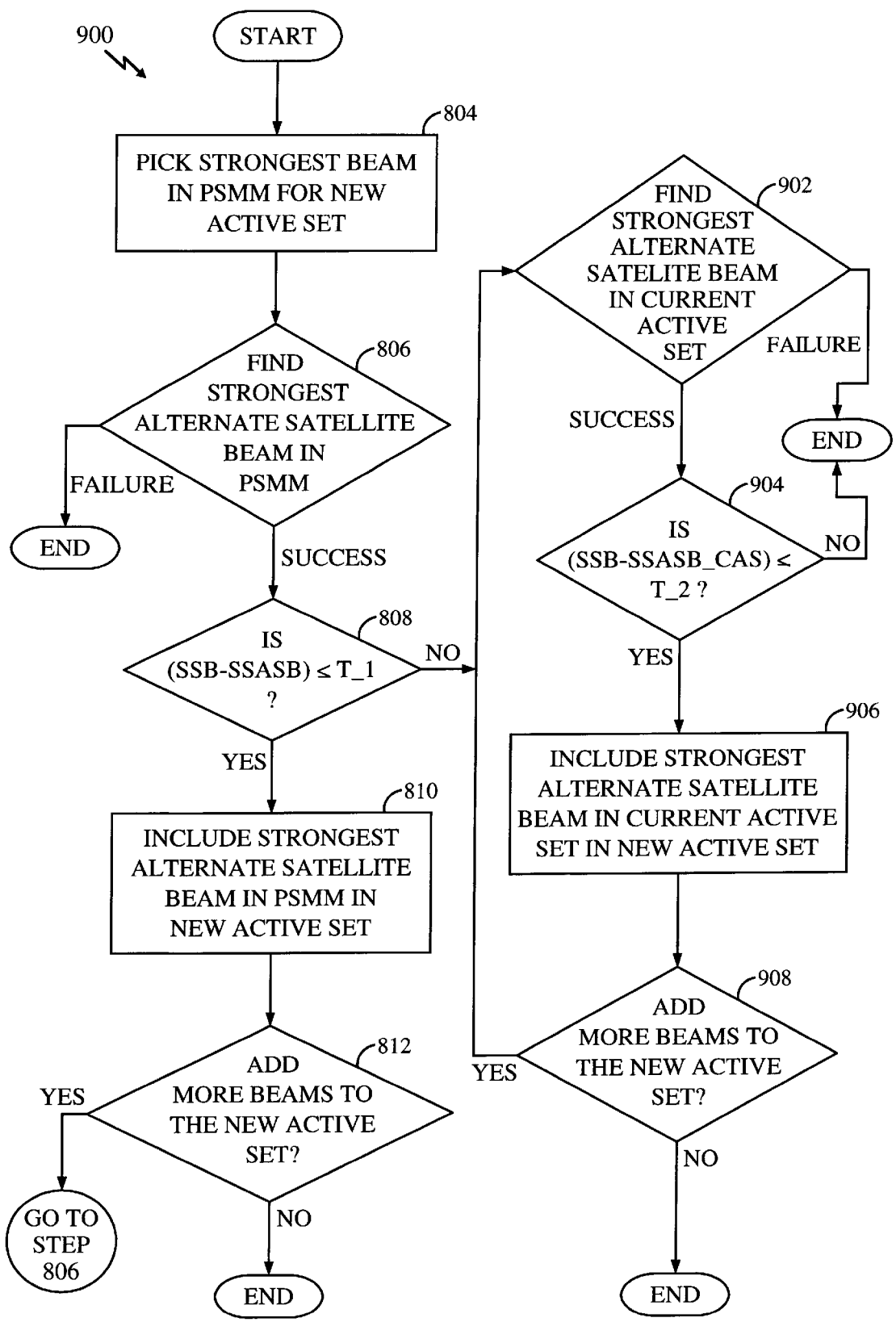
FIG. 9 illustrates a procedure used by a gateway for selecting beams for a new active set according to a second embodiment.

After receiving a PSMM from the user terminal, the gateway determines a new active beam set (step 512). The new active beam set is the set of beams that should be used as communication links between the gateway and the user terminal. FIGS. 8 and 9 illustrate two procedures (800 and 900) that can be used by the gateway in performing step 512 (i.e., determining the new active beam set). Procedure 800 is referred to as the Single Threshold Scheme (STS), and procedure 900 is referred to as the Dual Threshold Hysteresis Scheme (DTHS). The STS (procedure 800) will be described first and the DTHS (procedure 900) will be described second.

Procedure 800 begins at step 804. In step 804, the gateway selects the strongest beam in the PSMM and adds that beam to the new active beam set. That is, the gateway selects the largest beam strength value from the PSMM, determines the beam corresponding to the selected value, and adds that beam to the new active beam set. Prior to step 804, the new active beam set is set to "no beam." That is, the new active beam set is initialized and does not contain any beams.

In step 806, the gateway determines the strongest "alternate" beam in the PSMM, if there is one. An "alternate" beam is any satellite beam within the PSMM that is projected by a satellite other than a satellite that projects a beam that is in the new active set. The strongest "alternate" beam in the PSMM is, therefore, the alternate beam that has the largest beam strength value relative to the other alternate beams. To determine the strongest alternate beam within the PSMM, the gateway first selects a subset of values from the PSMM, where the subset of values includes all values in the PSMM that correspond to a beam projected by a satellite other than a satellite that projects a beam that is included in the new active set. Second, the gateway selects the largest value from the subset. Third, the gateway determines the beam that corresponds to the value selected in the previous step.

If a strongest alternate beam exists step 808 is performed, otherwise the process ends. In step 808, the gateway compares the strength of the strongest beam (SSB) in the PSMM (i.e., the beam selected in step 804) to the strength of the strongest alternate beam (SSAB) (i.e., the beam selected in step 806). If SSB minus SSAB is less than or equal to a first threshold ($T\_1$), then the gateway adds the strongest alternate beam in the PSMM to the new active beam set (step 810), otherwise the procedure ends and the new active beam set will contain only the strongest beam in the PSMM. In a preferred embodiment, $T\_1$ is on the order of 4 dB. But other embodiments are anticipated, such as $T\_1$ being 0 dB or $T\_1$ being infinitely large, in which case the strongest alternate beam will always be added to the new active set regardless of its strength.

After step 810, the procedure continues to step 812. In step 812, the gateway determines whether or not additional alternate beams should be added to the new active beam set. The number of alternative beams added to the new active beam set is determined by the level of desired satellite diversity. For example, if it is desirable to have only a two satellite diversity configuration, then the gateway will only attempt to add one alternative beam to the new active beam set. However, if an N satellite diversity configuration is desired, then the gateway will attempt to add N–1 alternative beams to the new active beam set.

The DTHS is similar to the STS. For example, the first four steps of procedure 900 are the same as the first four steps of procedure 800. The difference between procedure 800 and procedure 900 is that in procedure 900 step 902 is performed if SSB minus SSAB is not less than or equal to $T\_1$, whereas in procedure 800, if SSB minus SSAB is not less than or equal to $T\_1$, the procedure ends.

In step 902 the gateway selects the strongest alternate beam in the current active set, if there is one. The current active set refers to the set of active beams, where an active beam is a beam over which a communication link is already established between the gateway and the user terminal. An alternate beam in the current active set is a beam in the current active set that is projected by a satellite other than a satellite that projects a beam that is in the new active beam set. To determine the strongest alternate beam within the current active set, the gateway first selects a subset of values from the PSMM, where the subset of values includes all values in the PSMM set that correspond to a beam in the current active set that is projected by a satellite other than the satellite(s) that project(s) the beam(s) that are in the new active beam set. Second, the gateway selects the largest value from the subset. Third, the gateway determines the beam that corresponds to the value selected in the previous step.

If step 902 is successful, then step 904 is performed, otherwise the process ends. In step 904, the gateway determines whether or not the difference between the strength of the strongest beam (SSB) in the PSMM and the strength of the strongest alternate satellite beam in the current active set (SSASB_CAS) is less than or equal to a second threshold ($T\_2$). If the difference is less than or equal to $T\_2$, the strongest alternate beam in the current active set is added to the new active set (step 906), otherwise the process ends.

After step 906, the procedure continues to step 908. In step 908, the gateway determines whether or not additional alternate beams should be added to the new active beam set. The number of alternate beams added to the new active beam set is determined by the level of desired satellite diversity. For example, if it is desirable to have only a two satellite diversity configuration, then the gateway will only attempt to add one alternative beam to the new active beam set. However, if an N satellite diversity configuration is desired, then the gateway will attempt to add N–1 alternative beams to the new active beam set.

Preferably, $T\_2$ is greater than $T\_1$, and $T\_2$ is 6 dB when $T\_1$ is 4 dB. However, other values can be used for these thresholds. In the situation where $T\_2$ is greater than $T\_1$, the gateway gives preference to beams in the current active beam set, thereby reducing handoffs due to temporary beam signal strength fluctuations caused by, among other things, specular reflection. Thresholds $T\_1$ and $T\_2$ are chosen in part based on known satellite orbital distances (height above Earth) and velocities, which together determines the angles and rate of change of specular reflection.

The advantage of the Single Threshold Scheme (STS) is its implementation simplicity as compared to the Dual Threshold Hysteresis Scheme (DTHS). The DTHS, however, has a lower handoff rate than the STS. The DTHS achieves a lower handoff rate by smoothing out the chattering effect caused by beam signal strength fluctuations due to specular reflections. The chattering effect is a situation where the gateway alternately adds and drops a particular beam over a short time interval. At the termination of either process 800 or 900, the new active beam set will contain the beams that should be used as a communication link connecting the gateway with the user terminal.

After step 512, step 514 is performed. In step 514, the gateway determines if the new active beam set is equivalent to the current active beam set. The current active beam set consists of all the beams on which a communication link between the gateway and the user terminal is already established. If the new active beam set is the same as the current active beam set, the gateway does not initiate handoff, thereby allowing the user terminal to continue using the beams in the current active beam set (step 515). If the new active beam set is not equal to the current active beam set, the gateway will initiate beam handoff (steps 516–530).

In a preferred embodiment, the beam handoff is a "soft" beam handoff. That is, the gateway will not break the connections in the current active beam set until it receives confirmation from the user terminal that the user terminal is successfully receiving information on the beam(s) in the new active beam set. Consequently, as the first step of initiating a soft handoff, the gateway starts transmitting traffic on the beams in the new active beam set that are not in the current active beam set if there are any such beams (step 516). In the next step, the gateway sends a handoff direction message (HDM) to the user terminal (step 518). In one embodiment, the HDM can contain two sets of beam identifiers, and add beam set and a drop beam set. The add beam set contains a beam identifier for each beam within the new active beam set that is not in the current active beam set. It is possible for the add beam set to be empty, in which case the HDM will only contain the drop beam set. The drop beam set contains a beam identifier for each beam in the current active beam set that is not in the new active beam set. Like the add beam set, it is possible for the drop beam set to be empty, in which case the HDM will only contain the add beam set. In a second embodiment, the HDM contains a beam identifier corresponding to each beam in the new active beam set. Upon receiving the HDM according to the second embodiment, the user terminal can determine the add beam set and the drop beam set because the user terminal has knowledge of which beams are in the current active set.

In either the first or second embodiments, the user terminal, upon receiving an HDM, begins to receive traffic over the beams identified in the add beam set (step 520). Once the user terminal begins receiving information on the beams identified in the add beam set, the user terminal will stop receiving information on the beams identified in the drop beam set (step 522). The user terminal then transmits a handoff completion message (HCM) to the gateway (step 524). Upon receiving the HCM from the user terminal, the gateway stops transmitting traffic on the beams identified in the drop beam set (step 526). In this manner, soft beam handoff is accomplished.

Figure 10:
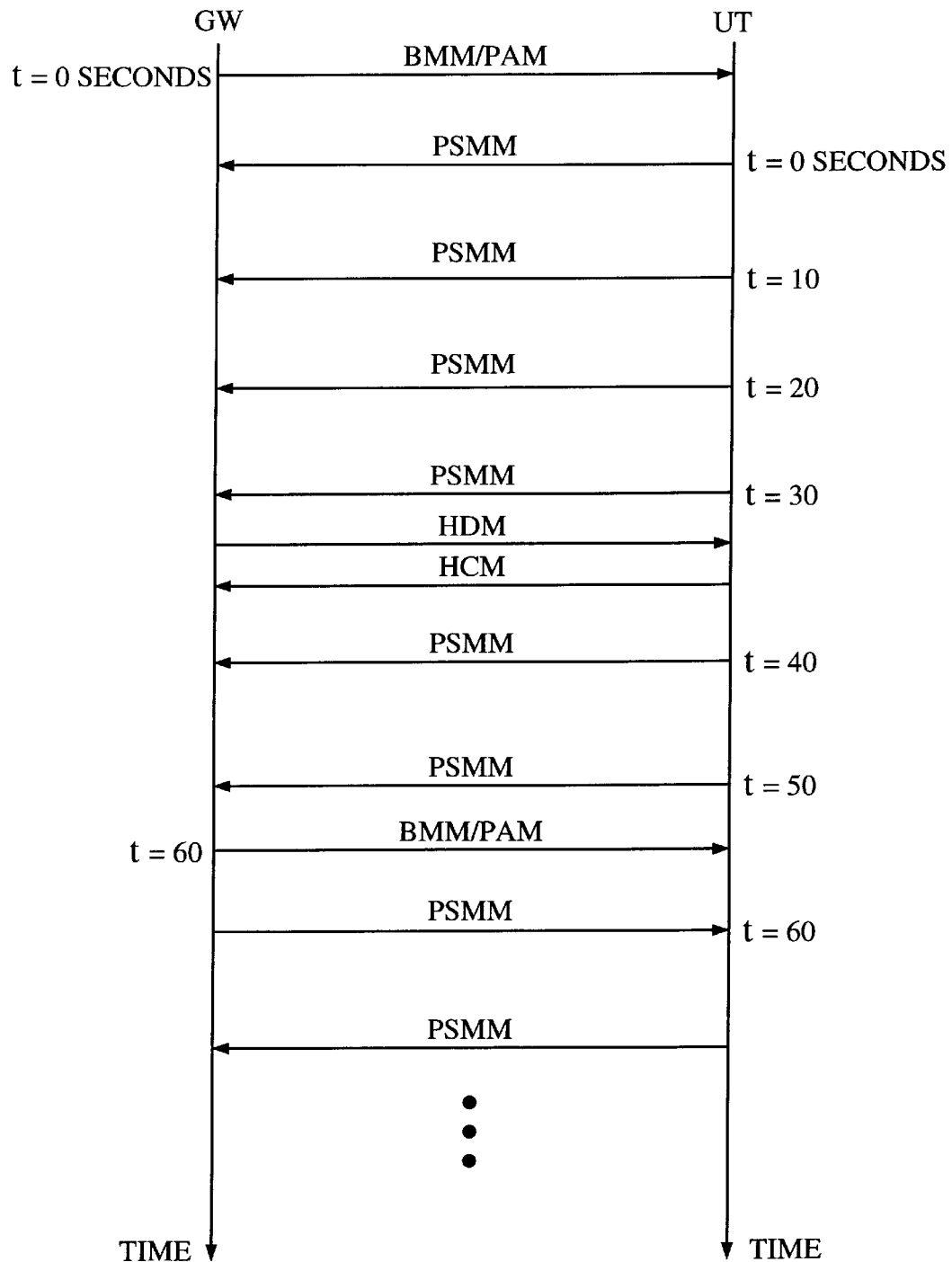
FIG. 10 illustrates an exemplary message flow between a gateway and user terminal.

An example of a flow of messages between the gateway and the user terminal is illustrated in FIG. 10. As shown in FIG. 10, the handoff process begins with the gateway periodically (e.g., every 60 seconds) sending a BMM/PAM to the user terminal. Upon receiving a BMM the user terminal periodically (e.g., every 10 seconds) sends a PSMM to the gateway. Upon receiving a PSMM from the user terminal, the gateway determines the most desirable beams to use (i.e., determines a new active beam set). If the new active beam set equals the current active beam set, then the gateway will not initiate a beam handoff. But, if the new active beam set is different than the current active beam set, the gateway will send an HDM to the user terminal. The user terminal will respond with an HCM.

As shown in FIG. 10, the user terminal typically sends a PSMM only after a predetermined amount of time has elapsed since a previous PSMM has been sent. But there is at least one situation where it is recommended for the user terminal to send to the gateway an "unscheduled" PSMM. An unscheduled PSMM is a PSMM that is sent to the gateway whenever a satellite blockage occurs, regardless of when the previous PSMM was sent. Satellite blockage is defined as the condition where the present strength of the active beam is less than the strength of the active beam as reported in the most recently transmitted PSMM minus a threshold amount (T_Loss) and remains so over a specified interval of time (T_TLoss). When this situation occurs, the user terminal will perform steps 506–510, thereby transmitting an unscheduled PSMM. As an example, assume the present strength of an active beam is 7 or less over an interval of T_TLoss and assume that the strength of the active beam as reported in the previous PSMM is 10. If 7<(10-T_Loss), then the user terminal will perform an unscheduled PSMM. The gateway will then perform step 512 as above. That is, the gateway uses the PSMM to determine which beam(s) should be used for transmitting traffic to the user terminal.

IV. User Terminal Transceiver Description

Figure 11:
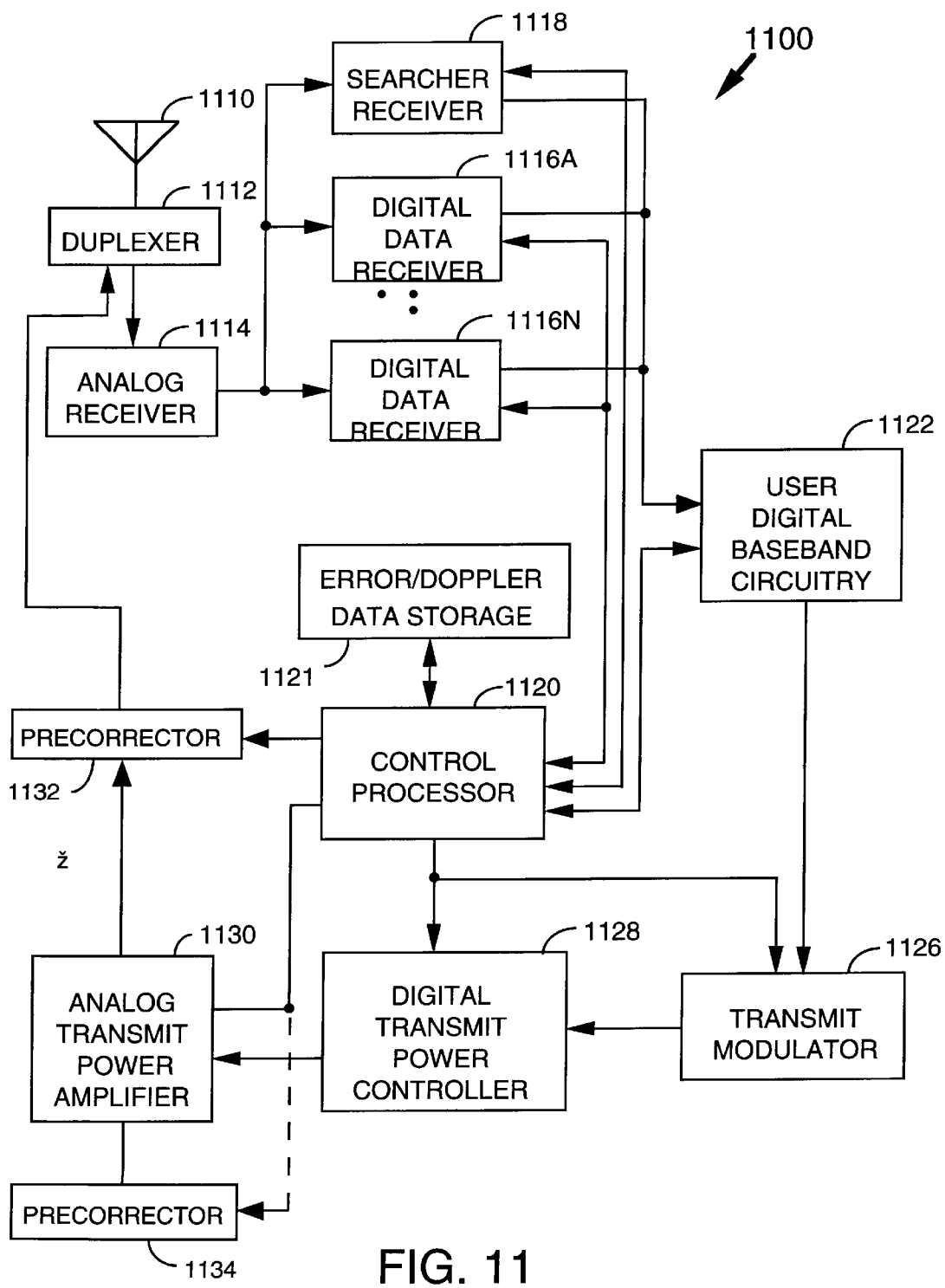
FIG. 11 illustrates an exemplary user terminal transceiver.

An exemplary transceiver 1100 for use in a user terminal 124 is illustrated in FIG. 11. Such transceivers are known in the art and discussed in patents such as U.S. Pat. No. 5,109,390, entitled *"Diversity Receiver In A CDMA Cellular Telephone System,"* which is incorporated herein by reference. Transceiver 1100 uses at least one antenna 1110 for receiving communication signals which are transferred to an analog receiver 1114, where they are down converted, amplified, and digitized. A duplexer element 1112 is typically used to allow the same antenna to serve both transmit and receive functions. However, some systems employ separate antennas for operating at different transmit and receive frequencies.

The digital communication signals output by analog receiver 1114 are transferred to at least one digital data receiver 1116A and preferably at least one searcher receiver 1118. Additional digital data receivers 1116B–1116N can be used to obtain desired levels of signal diversity or receive multiple signals, depending on the acceptable level of transceiver 1100 complexity, as would be apparent to one skilled in the relevant art. Additional searcher receivers can be used to implement more complex signal searching techniques.

At least one user terminal control unit 1120 is coupled to digital data receivers 1116A–1116N and searcher receiver 1118. Control unit 1120 provides, among other functions, basic signal processing, timing, power and beam handoff control or coordination, and selection of frequency used for signal carriers. Another basic control function often performed by control unit 1120 is the selection or manipulation of PN code sequences or orthogonal functions to be used for processing communication signal waveforms. Control unit 1120 signal processing can include a determination of relative signal strength and computation of various related signal parameters. Such computations of signal parameters, such as timing and frequency may include the use of additional or separate dedicated circuitry to provide increased efficiency or speed in measurements or improved allocation of control processing resources. For example, a signal strength measuring element can be connected to the analog receiver for using certain information available to determine the signal strength or power for the overall received analog signal. This measuring element can also be connected to receive outputs of, or data available from, the digital data and searcher receivers for measuring the energy or power in specific signals being received or demodulated.

The outputs of digital data receivers 1116A–1116N are coupled to digital baseband circuitry 1122 within the user terminal. User digital baseband circuitry 1122 comprises processing and presentation elements used to transfer information to and from a user terminal user. That is, signal or data storage elements, such as transient or long term digital memory; input and output devices such as display screens, speakers, keypad terminals, and handsets; A/D elements, vocoders and other voice and analog signal processing elements; etc., all form parts of the subscriber baseband circuitry using elements well known in the art. If diversity signal processing is employed, user digital baseband circuitry 1122 can comprise one or more diversity combiners and decoders. Some of these elements may also operate under the control of, or in communication with, control unit 1120.

When voice or other data is prepared as an output message or communications signal originating with the user terminal, user digital baseband circuitry 1122 is used to receive, store, process, and otherwise prepare the desired data for transmission. User digital baseband circuitry 1122 provides this data to a transmit modulator 1126 operating under the control of control unit 1120. The output of transmit modulator 1126 is transferred to a power controller 1128 which provides output power control to a transmit power amplifier 1130 for final transmission of the output signal from antenna 1110 to a gateway, or base station.

User terminal 1100 can also employ a precorrection element 1132 in the transmission path to adjust the frequency of the outgoing signal. This can be accomplished using well known techniques of up- or down-conversion of the transmission waveform. User terminal 1100 can also employ a precorrection element 1132 in the transmission path to adjust the timing of the outgoing signal. This can be accomplished using well known techniques of adding or subtracting delay in the transmission waveform.

Information or data corresponding to one or more measured signal parameters for received communication signals, or one or more shared resource signals, can be sent to the gateway using a variety of techniques known in the art. For example, the information can be transferred as a separate information signal or be appended to other messages prepared by user digital baseband circuitry 1122. Alternatively, the information can be inserted as predetermined control bits by transmit modulator 1126 or transmit power controller 1128 under control of control unit 1120 using known techniques.

Figure 12:
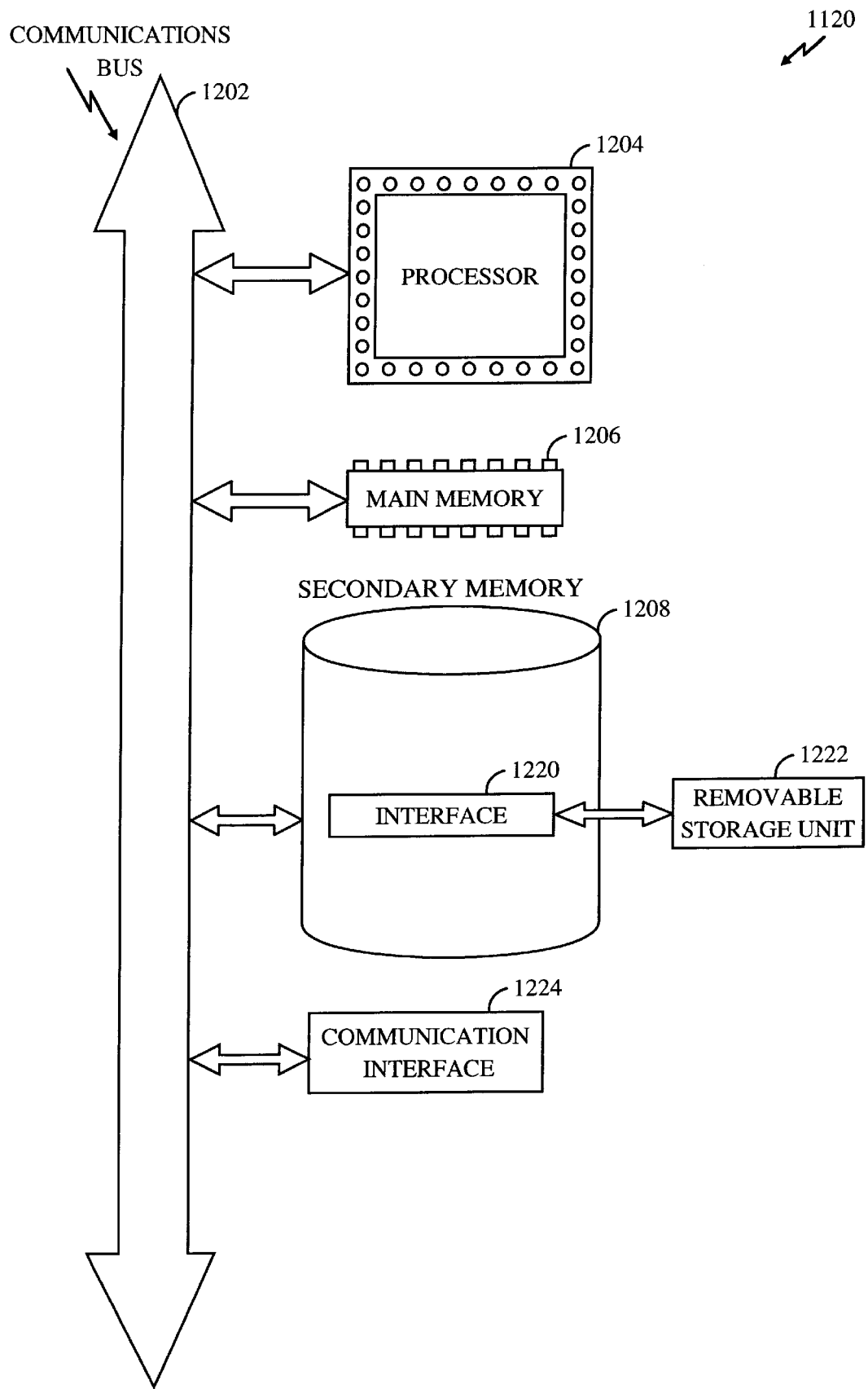
FIG. 12 illustrates an exemplary control unit of a user terminal.

Digital receivers 1116A–N and searcher receiver 1118 are configured with signal correlation elements to demodulate or track specific signals. Searcher receiver 1118 is used to search for pilot signals, or other relatively fixed pattern strong signals. The pilot channel is simply a signal that is not modulated by data, and may use a constant-value (pattern) or tone-type input, effectively transmitting only PN spreading codes. The digital receivers 1116A–N are used to demodulate other signals associated with detected pilot signals. For purposes of determining signal strength, however, a data receiver can be assigned to process the pilot signal after acquisition to accurately determine the ratio of signal chip energies to signal noise. Generally, pilot signal chip energies are integrated over predetermined intervals, such as symbol periods, to formulate pilot signal strength. Therefore, the outputs of receivers 1116A–N can be monitored to determine the energy in, or frequency of, the pilot signal or other signals. These receivers also employ frequency tracking elements that can be monitored to provide current frequency and timing information to control processor or unit 1120 for signals being demodulated As stated above, control unit 1120 provides, among other functions, beam handoff control. That is, for example, control unit 1120 receives BMMs from a gateway, measures beam strengths by monitoring the energy of the pilot signals, and transmits PSMMs to a gateway. An example control unit 1120 is shown in FIG. 12. The control unit 1120 includes one or more processors, such as processor 1204. The processor 1204 is connected to a communication bus 1202.

Control unit 1120 may be implemented in a software-controlled processor programmed to perform the functions described herein. That is, implemented as well known standard elements or generalized function or general purpose hardware including a variety of digital signal processors, programmable electronic devices, or computers that operate under the control of special function software or firmware programming to perform the desired functions.

Control unit 1120 also includes a main memory 1206, preferably random access memory (RAM), and can also include a secondary memory 1208. The secondary memory 1208 can include, for example, means for allowing computer programs or other instructions to be loaded into control unit 1120. Such means can include, for example, a storage device 1222 and an interface 1220. Examples of such can include a memory chip (such as an EPROM, or PROM) and associated socket, and other storage devices 1222 and interfaces 1220 which allow software and data to be transferred from the storage device 1222 to control unit 1120.

Control unit 1120 can also include a communications interface 1224. Communications interface 1224 allows software and data to be transferred between control unit 1120 and digital data receiver 1116, for example.

In this document, the terms "computer program medium" and "computer usable medium" are used to generally refer to media such as removable storage 1222 and main memory 1206. These computer program products are means for providing software to control unit 1120.

Control or computer programs (also called computer control logic) are stored in main memory and/or secondary memory 1208. Such computer programs, when executed, enable the control unit 1120 to perform the features of the present invention as discussed herein. In particular, for example, the computer programs, when executed, enable the processor 1204 to perform measured beam strength value comparisons. Accordingly, such computer programs represent controllers of the control unit 1120.

In another embodiment, the control unit 1120 is implemented primarily in specialized hardware configured for this function using, for example, hardware components such as application specific integrated circuits (ASICs), or one or more circuit card assemblies. Implementation of the hardware state machine so as to perform the functions described herein will be apparent to persons skilled in the relevant art(s).

In yet another embodiment, control unit 1120 is implemented using a combination of both hardware and software.

V. Gateway

Figure 13:
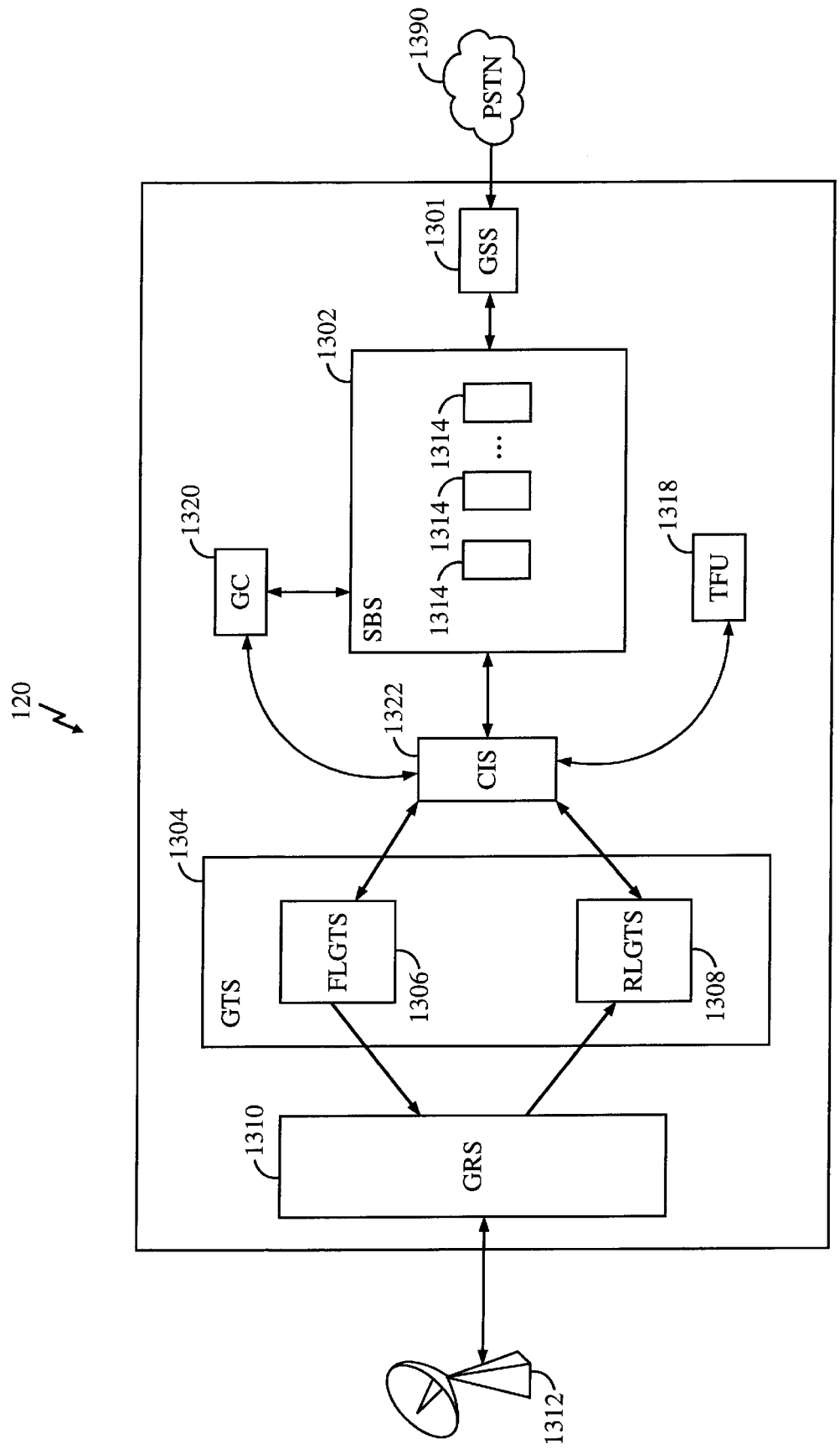
FIG. 13 illustrates exemplary components of a gateway used in performing the beam handoff algorithm.

FIG. 13 illustrates components of gateway 120 that enable the gateway to perform the features of the present invention. As shown in FIG. 13, gateway 120 includes a gateway switching subsystem (GSS) 1301 connected to the public switched telephone network (PSTN) 1390, a selector bank subsystem (SBS) 1302, a time and frequency unit (TFU) 1318, a gateway controller (GC) 1320, a CDMA interconnect subsystem (CIS) 1322, a gateway transmission system (GTS) 1304, and a gateway RF subsystem (GRS) 1310. The GTS includes a forward link transmission system (FLGTS) 1306 and a reverse link transmission system (RLGTS) 1308. FLGTS 1306 takes packetized data from SBS 1302, modulates and frequency converts the data to an IF frequency (800–1000 MHz), and delivers it to the gateway RF subsystem (GRS) 1310, which delivers it to antenna 1312 for transmission to a satellite. The satellite then relays the signal to a user terminal. The packetized data received at FLGTS 1306 from SBS 1302 includes: traffic frames; overhead message frames; and power control information. The traffic frames may contain BMMs, PAMs, and HDMs. In this manner, a gateway transmits BMMs, PAMs, and HDMs to a user terminal.

RLGTS 1308 receives IF signals from GRS 1310, down converts and demodulates them, and sends packetized data to SBS 1302 for further processing. The packetized data received at SBS 1302 includes: traffic frames and overhead message frames transmitted from a user terminal. PSMMs and HCMs are transmitted from a user terminal to a gateway in a traffic frame. In this manner, PSMMs and HCMs are received at the gateway.

SBS 1302 includes one or more selectors 1314 for processing voice calls and performing the actions necessary to accomplish beam handoff. For example, selectors 1314 evaluate PSMMs sent from a user terminal to determine which, if any, new beams are to be added, and which, if any, are to be dropped. Before adding beams, the SBS 1302 sends a forward link resource request to the GC 1320. If the resource request is granted, a selector 1314 signals FLGTS 1306 to begin transmitting forward traffic on the new beam. Once FLGTS 1306 starts transmitting the traffic, the selector 1314 sends an HDM to the user terminal. Upon receiving the traffic on the new beam, the user terminal send an HCM to the selector 1314. After receiving the HCM, the selector 1314 signals FLGTS 1306 to stop transmitting traffic on a dropped beam, if there is one.

As in the case of control unit 1120, selector 1314 may be implemented in a software-controlled processor programmed to perform the functions described herein. That is, implemented as well known standard elements or generalized function or general purpose hardware including a variety of digital signal processors, programmable electronic devices, or computers that operate under the control of special function software or firmware programming to perform the desired functions.

Figure 14:
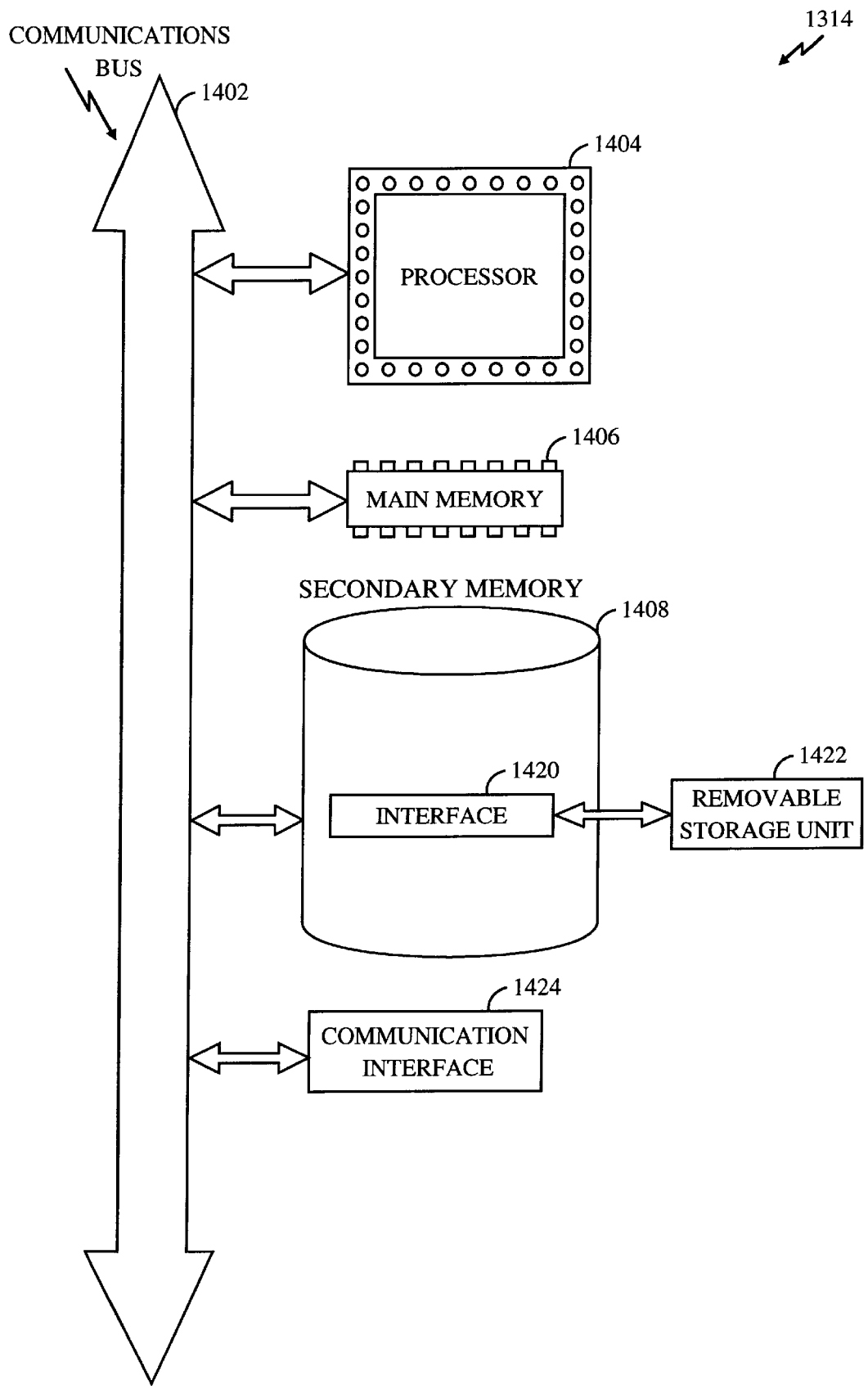
FIG. 14 illustrates an exemplary gateway selector.

An example selector 1314 is shown in FIG. 14. The selector 1314 includes one or more processors, such as processor 1404. The processor 1404 is connected to a communication bus 1402. Selector 1314 also includes a main memory 1406, preferably random access memory (RAM), and can also include a secondary memory 1408. The secondary memory 1408 can include, for example, means for allowing computer programs or other instructions to be loaded into selector 1314. Such means can include, for example, a removable storage unit 1422 and an interface 1420. Examples of such can include a removable memory chip (such as an EPROM, or PROM) and associated socket, hard drives, magnetic tape, compact disc and other similar optical storage devices, and other removable storage units 1422 and interfaces 1420 which allow software and data to be transferred from the removable storage unit 1422 to selector 1314. Selector 1314 can also include a communications interface 1424. Communications interface 1424 allows data to be transferred between selector 1314 and FLGTS, for example.

Computer programs (also called computer control logic) are stored in main memory and/or secondary memory 1408. Such computer programs, when executed, enable the selector 1314 to perform the features of the present invention as discussed herein. In particular, for example, the computer programs, when executed, enable the processor 1404 to perform measured beam strength value comparisons. Accordingly, such computer programs represent controllers of the selector 1314.

In another embodiment, the selector 1314 is implemented primarily in hardware configured for this function using, for example, hardware components such as application specific integrated circuits (ASICs), or one or more circuit card assemblies. Implementation of the hardware state machine so as to perform the functions described herein will be apparent to persons skilled in the relevant art(s).

In yet another embodiment, selector 1314 is implemented using a combination of both hardware and software.

VI. Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. In a multi-beam communication system having a user terminal, a communication station, and a beam source, wherein the beam source projects a plurality of beams, and wherein a communication link between the user terminal and communication station is established on at least one of the plurality of beams, a method for reducing call dropping rates, comprising the steps of:

(1) receiving at the user terminal a plurality of beam identifiers transmitted from the communication station;

(2) measuring at the user terminal a beam strength of each beam identified by said plurality of beam identifiers;

(3) transmitting from the user terminal to the communication station aplurality of beam strength values, wherein each of said plurality of beam strength values is a function of a measured beam strength of a beam identified by one of said plurality of beam identifiers; and (4) receiving at the user terminal a handoff direction message transmitted by the communication station, wherein:

(a) based on said handoff direction message, the user terminal determines which beam or beams should be used for receiving information transmitted from the communication station, (b) said handoff direction message comprises a beam identifier corresponding to each beam in a new active beam set, and (c) said new active beam set includes beams selected by the communication station that should be used as a communication link between the communication station and the user terminal.

2. The method of claim 1, wherein upon receiving said handoff direction message, the user terminal begins receiving traffic over each beam in said new active beam set that is not in a current active beam set, wherein said current active beam set includes all beams on which a communication link between the communication station and the user terminal is already established.

3. The method of claim 2, further comprising the step of transmitting a handoff completion message from the user terminal to the communication station after the user terminal begins receiving traffic over each beam in said new active beam set that is not in said current active beam set.

4. In a multi-beam communication system having a user terminal, a communication station, and a beam source, wherein the beam source projects a plurality of beams, and wherein a communication link between the user terminal and communication station is established on at least one of the plurality of beams, a method for reducing call dropping rates, comprising the steps of:

(1) receiving at the user terminal a plurality of beam identifiers transmitted from the communication station;

(2) measuring at the user terminal a beam strength of each beam identified by said plurality of beam identifiers;

(3) transmitting from the user terminal to the communication station a plurality of beam strength values, wherein each of said plurality of beam strength values is a function of a measured beam strength of a beam identified by one of said plurality of beam identifiers; and (4) receiving at the user terminal a handoff direction message transmitted by the communication station, wherein,
- (a) based on said handoff direction message, the user terminal determines which beam or beams should be used for receiving information transmitted from the communication station,
- (b) said handoff direction message comprises a beam identifier corresponding to each beam in a new active beam set that is not in a current active beam set,
- (c) said current active beam set includes all beams on which a communication link between the communication station and the user terminal is already established, and
- (d) said new active beam set includes beams selected by the communication station that should be used as a communication linl between the communication station and the user terminal.

5. The method of claim 4, wherein upon receiving said handoff direction message, the user terminal begins to receive traffic on a beam identified by a beam identifier in said handoff direction message.

6. Th e method of claim 5, further comprising the step of transmitting a handoff completion message from the user terminal to the communication station.

7. In a multi-beam communication system having a user terminal, a communication station, and a beam source, wherein the beam source projects a plurality of beams, and wherein a communication link between the user terminal and communication station is established on at least one of the plurality of beams, a method for reducing call dropping rates, comprising the steps of:

(1) receiving at the user terminal a plurality of beam identifiers transmitted from the communication station;

(2) measuring at the user terminal a beam strength of each beam identified by said plurality of beam identifiers;

(3) transmitting from the user terminal to the communication station a plurality of beam strength values, wherein each of said plurality of beam strength values is a function of a measured beam strength of a beam identified by one of said plurality of beam identifiers; and (4) receiving at the user terminal a handoff direction message transmitted by the communication station, wherein, based on said handoff direction message, the user terminal determines which beam or beams should be used for receiving information transmitted from the communication station, wherein
- (a) said handoff direction message comprises a beam identifier corresponding to each beam in a current active beam set that is not in a new active beam set,
- (b) said new active beam set includes beams selected by the communication station that should be used as a communication link between the communication station and the user terminal, and
- (c) said current active beam set includes all beams on which a communication link between the communication station and the user terminal is already established.

8. The method of claim 7, wherein, after receiving said handoff direction message, the user terminal stops receiving traffic on a beam identified by a beam identifier in said hand off direction message.

9. In a multi-beam communication system having a user terminal, a communication station, and a plurality of beam sources, wherein each beam source projects a plurality of beams, and wherein a communication link between the user terminal and the communication station is established on one or more beams, a method for reducing call dropping rates, comprising the steps of:

(1) transmitting from the communication station to the user terminal a plurality of beam identifiers, wherein said plurality of beam identifiers identifies a plurality of beams and a plurality of beam sources currently in use by the communication station;

(2) receiving at the communication station a plurality of beam strength values transmitted by the user terminal, wherein each of said plurality of beam strength values is a function of a measured beam strength of a beam identified by one of said plurality of beam identifiers;

(3) determining at the communication station a new active beam set based on said plurality of beam strength values, wherein said new active beam set includes one or more beams that should be used as a communication link between the communication station and the user terminal, including the steps of:
- (a) selecting a first beam having the strongest beam strength based on said plurality of beam strength values, wherein said first beam is projected by a first beam source,
- (b) including said first beam in said new active beam set,
- (c) selecting a first subset of beam strength values from said plurality of beam strength values, wherein said first subset of beam strength values includes each of said plurality of beam strength values that correspond to a beam projected by a beam source other than said first beam source,
- (d) selecting a second beam having the strongest beam strength based on said first subset of beam strength values, and
- (e) including said second beam in said new active beam set if the strength of said first beam minus the strength of said second beam is less than or equal to a threshold amount greater than or equal to zero; and (4) transmitting traffic from the communication station to the user terminal on said beams within said new active beam set.

10. The method of claim 9, wherein the step of determining at the communication station a new active beam set further comprises the steps of:
- (6) selecting a second subset of beam strength values from said first subset, wherein each beam strength value within said second subset of beam strength values corresponds to an active beam, wherein an active beam is a beam over which information is currently being transmitted between the user terminal and the communication station;
- (7) selecting a third beam having the strongest beam strength based on said second subset of beam strength values; and
- (8) including said third beam in said new active beam set if the strength of said first beam minus the strength of said third beam is less than or equal to a second threshold amount.

11. The method of claim 10, wherein said second threshold amount is greater than or equal to said first threshold amount.

12. In a multi-beam communication system having a user terminal, a communication station, and a beam source, wherein the beam source projects a plurality of beams, and wherein a communication link between the user terminal and communication station is established on at least one beam, a system within the user terminal for reducing call dropping rates, comprising:

beam identifier receiving means for receiving a plurality of beam identifiers transmitted from the communication station, wherein said beam identifiers identify a plurality of beams currently in use by the communication station;

beam strength measuring means for measuring a beam strength of each beam identified by said plurality of beam identifiers;

transmitting means for transmitting to the communication station a plurality of beam strength values, wherein each of said plurality of beam strength values is a function of a measured beam strength of a beam identified by one of said plurality of beam identifiers;

handoff direction message receiving means for receiving a handoff direction message transmitted by the communication station; and means for determining which beam or beams should be used for receiving information transmitted from the communication station based on said handoff direction message; wherein said handoff direction message comprises a beam identifier corresponding to each beam in a current active beam set that is not in a new active beam set, said new active beam set includes beams selected by the communication station that should be used as a communication link between the communication station and the user terminal, and said current active beam set includes all beams on which a communication link between the communication station and the user terminal is already established.

13. The system of claim 12, wherein, after receiving said handoff direction message, the user terminal stops receiving traffic on a beam identified by a beam identifier in said hand off direction message.

14. In a multi-beam communication system having a user terminal, a communication station, and a beam source, wherein the beam source projects a plurality of beams, and wherein a communication link between the user terminal and communication station is established on at least one beam, a system within the user terminal for reducing call dropping rates, comprising:

means for receiving a plurality of beam identifiers transmitted from the communication station, wherein said beam identifiers identify a plurality of beams currently in use by the communication station;

means for measuring a beam strength of each beam identified by said plurality of beam identifiers;

transmitting means for transmitting to the communication station a plurality of beam strength values, wherein each of said plurality of beam strength values is a function of a measured beam strength of a beam identified by one of said plurality of beam identifiers;

means for receiving beam strength adjustment values transmitted by the communication station; and adjusting means for adjusting said plurality of beam strength values according to said received beam strength adjustment values, wherein said adjusting means adjusts said plurality of beam strength values according to said received beam strength adjustment values prior to said transmitting means transmitting said plurality of beam strength values to the communication station, whereby the communication station will receive adjusted beam strength values.

15. In a multi-beam communication system having a user terminal, a communication station, and a plurality of beam sources, wherein each beam source projects a plurality of beams, and wherein a communication link between the user terminal and communication station is established on one or more beams, a system within the communication station for reducing call dropping rates, comprising:

means for identifying a plurality of beams currently in use by the communication station;

means for transmitting to the user terminal a plurality of beam identifiers, wherein each beam identifier identifies one of said beams currently in use by the communication station;

means for receiving a plurality of beam strength values transmitted by the user terminal, wherein each of said plurality of beam strength values is a function of a measured beam strength of a beam identified by one of said plurality of beam identifiers;

means for determining a new active beam set based on said plurality of beam strength values, wherein said new active beam set includes one or more beams that should be used as a communication link between the communication station and the user terminal, including:

means for selecting a first beam having the strongest beam strength based on said plurality of beam strength values, wherein said first beam is projected by a first beam source, means for including said first beam in said new active beam set, means for selecting a first subset of beam strength values from said plurality of beam strength values, wherein said first subset of beam strength values includes each of said plurality of beam strength values that correspond to a beam projected by a beam source other than said first beam source, means for selecting a second beam having the strongest beam strength based on said first subset of beam strength values, and means for including said second beam in said new active beam set if the strength of said first beam minus the strength of said second beam is less than or equal to a threshold amount greater than or equal to zero; and means for transmitting traffic to the user terminal on said beams within said new active beam set.

16. The system of claim 15, wherein said means for determining a new active beam set further comprises:

(f) means for selecting a second subset of beam strength values from said first subset, wherein each beam strength value within said second subset of beam strength values corresponds to an active beam, wherein an active beam is a beam over which information is currently being transmitted between the user terminal and the communication station;

(g) means for selecting a third beam having the strongest beam strength based on said second subset of beam strength values; and (h) means for including said third beam in said new active beam set, wherein said means for including said third beam in said new active beam set includes said third beam in said new active beam set if the strength of said first beam minus the strength of said third beam is less than or equal to a second threshold amount.

17. The system of claim 16, wherein said second threshold amount is greater than or equal to said first threshold amount.

18. For use in a multi-beam communication system having a user terminal, a communication station, and a plurality of beam sources, wherein each beam source projects a plurality of beams, and wherein a communication link between the user terminal and communication station is established on one or more beams, computer program logic stored on a computer useable medium, comprising:

means for enabling the communication station to identify a plurality of beams currently in use by the communication station;

means for enabling the communication station to transmit to the user terminal a plurality of beam identifiers, wherein each beam identifier identifies one of said beams currently in use by the communication station;

means for enabling the communication station to receive a plurality of beam strength values transmitted from the user terminal, wherein each of said plurality of beam strength values is a function of a measured beam strength of a beam identified by one of said plurality of beam identifiers;

means for enabling the communication station to determine, based on said plurality of beam strength values, a new active beam set, wherein said new active beam set includes one or more beams that should be used as a communication link between the communication station and the user terminal, including:

means for enabling the communication station to select a first beam having the strongest beam strength based on said plurality of beam strength values, wherein said first beam is projected by a first beam source, means for enabling the communication station to include said first beam in said new active beam set, means for enabling the communication station to select a first subset of beam strength values from said plurality of beam strength values, wherein said first subset of beam strength values includes each of said plurality of beam strength values that correspond to a beam projected by a beam source other than said first beam source, means for enabling the communication station to select a second beam having the strongest beam strength based on said first subset of beam strength values, and means for enabling the communication station to include said second beam in said new active beam set if the strength of said first beam minus the strength of said second beam is less than or equal to a threshold amount greater than or equal to zero; and means for enabling the communication station to transmit traffic to the user terminal on said beams within said new active beam set.

19. The system of claim 18, wherein said means for enabling the communication station to determine, based on said plurality of beam strength values, a new active beam set further comprises:

(f) means for enabling the communication station to select a second subset of beam strength values from said first subset, wherein each beam strength value within said second subset of beam strength values corresponds to an active beam, wherein an active beam is a beam over which information is currently being transmitted between the user terminal and the communication station;

(g) means for enabling the communication station to select a third beam having the strongest beam strength based on said second subset of beam strength values; and (h) means for enabling the communication station to include said third beam in said new active beam set, wherein the communication station includes said third beam in said new active beam set if the strength of said first beam minus the strength of said third beam is less than or equal to a second threshold amount.

20. The system of claim 19, wherein said second threshold amount is greater than or equal to said first threshold amount.

* * * * *